US008031886B2

(12) United States Patent
Kageyama et al.

(10) Patent No.: US 8,031,886 B2
(45) Date of Patent: Oct. 4, 2011

(54) AUDIO SIGNAL PROCESSING SYSTEM

(75) Inventors: Takahisa Kageyama, Hamamatsu (JP); Tatsuya Umeo, Hamamatsu (JP); Atsushi Fukada, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 955 days.

(21) Appl. No.: 11/963,483

(22) Filed: Dec. 21, 2007

(65) Prior Publication Data

US 2008/0175414 A1 Jul. 24, 2008

(30) Foreign Application Priority Data

Dec. 27, 2006 (JP) ................................ 2006-351377

(51) Int. Cl.
*H04B 1/00* (2006.01)

(52) U.S. Cl. .......................... 381/119; 381/118; 700/94

(58) Field of Classification Search .................. 381/119, 381/118; 700/94
See application file for complete search history.

(56) References Cited

U.S. PATENT DOCUMENTS 6,061,458 A * 5/2000 East et al. ..................... 381/119
6,374,148 B1 * 4/2002 Dharmarajan et al. ......... 700/94
6,795,560 B2 * 9/2004 Hamamatsu .................. 381/119
6,839,441 B1 * 1/2005 Powers et al. ................ 381/119
7,107,110 B2 * 9/2006 Fay et al. ........................ 700/94
2005/0038922 A1 2/2005 Yamamoto et al.
2006/0015198 A1 1/2006 Okabayashi et al.

FOREIGN PATENT DOCUMENTS

JP 2005-64880 3/2005

OTHER PUBLICATIONS

European Search Report mailed Jul. 22, 2010, for EP Application No. 07124087.3, five pages.
Yamaha. (2003). Digital Mixing Studio 01X Owner's Manual, located at http://www2.yamaha.co.jp/manual/pdf/emi/english/synth/01x_en_om.pdf>, last visited Jun. 21, 2010, 156 pages.
01X Supplementary Manual Using the OX1 with Cubase SX "3", Yamaha Corporation, 2005.

* cited by examiner

*Primary Examiner* — Douglas Menz
(74) *Attorney, Agent, or Firm* — Morrison & Foerster LLP

(57) ABSTRACT

In a mixer system having a digital mixer having functions of processing an audio signal in an input channel and outputting the signal via an ST bus, and a PC executing a DAW application realizing a function of plural tracks to record waveform data, a WET button corresponding to the input channel is provided to the digital mixer to select a DRY mode for inputting signal which is inputted from outside the device to the input channel, to the ST bus without sending the signal to the DAW application, or a WET mode for inputting signal which are inputted from outside the device to input channel, to the ST bus after sending the signal to the DAW application for processing and being sent back to the digital mixer, in response to a pressing of the WET button.

13 Claims, 12 Drawing Sheets

FIG. 4

| WAVEFORM DATA SOURCE IN DIGITAL MIXER (CHANNEL OR BUS) | OUTPUT PORT |
|---|---|
| INPUT CHANNEL (1-12) | P1-P12 |
| ST (L, R) | P15, P16 |
| REC (L, R) | P13, P14 |

FIG. 5

| WAVEFORM DATA SOURCE IN DAW APPLICATION (BUS) | OUTPUT PORT |
|---|---|
| ST (L, R) | P1, P2 |
| 5.1ch (L, R) | P1, P2 |
| 5.1ch (C, LFE) | P3, P4 |
| 5.1ch (Ls, Rs) | P5, P6 |
| AUX (L, R) | P15, P16 |
| CHANNEL (1-12) | P3-P14 |

AUDIO SIGNAL PROCESSING SYSTEM

BACKGROUND OF THE INVENTION

1. Field of the Invention

The invention relates to an audio signal processing system wherein an audio signal processing device processing and outputting an input audio signal operates in cooperation with a computer executing an application program realizing an audio signal processing function.

2. Description of the Related Art

Conventionally, an audio signal processing device such as a digital mixer, having specialized hardware for audio signals are known as a device for processing and outputting input audio signals. Further, a processing function such as recording, reproducing, effect addition, or mixing of audio signals is realized by executing an application program called a DAW (Digital Audio Workstation) in a general-purpose computer such as a PC (personal computer).

Further, the above described audio signal processing device and the computer are connected to each other to constitute an audio signal processing system and those devices transmit and receive data to and from each other and operate in cooperation.

However, in such a case, providing a physical communication path between the audio signal processing device and the computer is not enough and it is required to set a logical connection, in which, for example, it is determined which channel(ch)'s output data in the audio signal processing device is to be inputted to which channel (or track) of the computer. Such a logical connection can be automatically performed by a driver installed in the computer.

Such a technique is disclosed in, for example, following Document 1.

Document 1:

Japanese publication of unexamined patent applications No. 2005-64880

In addition to the above, regarding a usage of an audio signal processing device connected to a computer, a technique for a remote control of the DAW operation in the computer with an operation panel of the audio signal processing device has been developed. For example, the remote control is used to instruct the DAW to start or stop recording or to adjust fader in each channel.

This technique is disclosed in, for example, following Document 2.

Document 2:

"01× Supplemental Manual," Yamaha Corporation, 2005

SUMMARY OF THE INVENTION

When an audio signal processing system is established, proper settings are required to set to both of the audio signal processing device and the computer to obtain a desired operation. However, in a conventional audio signal processing system, since the audio signal processing device and the DAW have to be set individually, there is a problem in its operability.

For example, conventionally, when switching output of each channel between sound processed only in the digital mixer and sounds sent to the DAW and sent back to the digital mixer after processing in the DAW, the user has to perform an ON/OFF operation as regards the output from input channel to buses, identify a track in the DAW inputting the signal from the input channel, and perform an ON/OFF operation as regards the monitor of the identified track.

However, especially in an operation for switching sounds to be monitored, an easy and quick switching is important and an improvement in its operability has been desired.

The invention is made to solve the above problem and has an object to improve the operability of an audio signal processing system established by connecting an audio signal processing device and a computer.

To attain the above object, the present invention provides an audio signal processing system including: an audio signal processing device that processes one or more inputted audio signals in one or more channels, mixes the processed signals in one or more buses, and outputs the signals mixed in the buses; and a computer that sends and receives plural audio signals to and from the audio signal processing device via a communication path and executes an application program which realizes a function of plural tracks, each of which inputs an audio signal selected from the received audio signals, records the input signal, plays back the recorded signal, and outputs one of the signal inputted to the track and the played back signal to be sent to the audio signal processing device. The audio signal processing device sends an audio signal inputted to each channel of the audio signal processing device to the computer via the communication path, wherein the audio signal processing device includes a selection control that accepts a first selecting operation of a user, corresponding to any one of the channels, and selects one of a dry signal of the channel, which is an audio signal processed in the channel, and a wet signal of the channel, which is an audio signal sent from the channel in the audio signal processing device to the computer and sent back to the audio signal processing device via the communication path after processed in the computer, to be supplied to the bus in response to the first selecting operation. When the dry signal is selected by the selection control of one of the channels, the audio signal processing device controls itself to supply an audio signal processed in the one channel, as the dry signal of the channel, to the bus and remote-controls the computer not to send back the audio signal from a track to which the audio signal sent from the one channel is inputted, to the audio signal processing device via the track and the communication path, and when the wet signal is selected by the selection control of one of the channels, the audio signal processing device controls itself not to supply the audio signal processed in the one channel to the bus and remote-controls the computer to send back the audio signal from a track to which the audio signal sent from the one channel is inputted, as the wet signal of the channel, to the audio signal processing device via the communication path to supply the returned signal to the bus.

In such an audio signal processing system, it is preferable that the audio signal processing device remote-controls the track in the computer, to which the audio signal sent from the one channel is inputted, if the track is in a recording standby state.

Further, it is also preferable that the audio signal processing device includes plural channels, and the audio signal processing device includes a master selection control that accepts a second selecting operation of the user, corresponding to all of the channels, and causes the selection control to select wet signals to be supplied to the bus for all of the channels.

Further, it is also preferable that the audio signal processing device includes a display corresponding to the selection control and a display controller that displays, on the display, that a selection by the selection control is not reflected to the remote control when the audio signal sent from the one channel is inputted to no track in the computer.

Alternatively, it is also preferable that the audio signal processing device includes a display corresponding to the selection control and a display controller that displays, on the display, that a selection by the selection control is not reflected to the remote control when the track, to which the audio signal as the signal sent from the one channel is inputted, is not in a recording standby state in the computer.

Alternatively, it is also preferable that, when one track in the computer is switched from a released state to the recording standby state by the user, the state of the dry/wet selection of a channel in the audio signal processing device, from which the audio signal inputted to the one track is sent, is checked. If the wet signal is selected, the audio signal processing device controls itself not to supply the audio signal processed in the channel to the bus and remote-controls the computer to send back the audio signal from a track to which the audio signal sent from the channel is inputted, as the wet signal of the channel, to the audio signal processing device via the communication path to supply the returned signal to the bus.

Alternatively, it is also preferable that the audio signal processing device is a digital mixer.

Alternatively, it is also preferable that the audio signal processing device includes a channel strip corresponding to the channel and provided with controls for setting parameters of the corresponding channel.

Further, it is also preferable that the selection control is provided in the channel strip.

Alternatively, it is also preferable that the audio signal processing device includes a connection confirmation indicator which displays whether logical connection between the audio signal processing device and the application program executed in the computer is established or not.

Alternatively, it is also preferable that the audio signal processing device includes a connection detector that detects whether logical connection between the audio signal processing device and the application program executed in the computer is established or not. The audio signal processing device remote-controls the computer only if the connection detector detects that logical connection between the audio signal processing device and the application program executed in the computer is established.

Another audio signal processing system of the invention includes: a computer that executes application software to realize a function of a recording and editing device that records and edits the audio signals; and an audio signal processing device that processes the audio signals, the computer and the audio signal processing device being connected via a communication path through which a control signal and plural audio signals can be transmitted. The computer includes a transmission and reception device that receives the audio signals sent by the audio signal processing device to supply to the recording and editing device and transmits the audio signals supplied from the recording and editing device to the audio signal processing device via the communication path. The recording and editing device includes a plurality of tracks that record and/or reproduce audio signals inputted to the tracks; a plurality of selecting devices provided corresponding to the tracks respectively to select an audio signal to input to a corresponding track from the audio signals supplied from the transmission and reception device; a plurality of track channels provided corresponding to the tracks respectively to select one of an audio signal inputted to the track and an audio signal reproduced in the track and control a characteristic of the selected audio signal; and a first mixing bus that mixes the audio signals supplied from the plurality of track channels to supply to the transmission and reception device. The audio signal processing device includes an input device that inputs an audio signal from outside the device; one or more input channels that controls a characteristic of the audio signal inputted from the input device; a transmission and reception device that transmits the audio signal inputted from each of the input channel by the input device to the computer via the communication path and receives an audio signal from the computer via the communication path; a second mixing bus that mixes the audio signals supplied from each of the input channels and the audio signal supplied from the transmission and reception device and outputs the mixed signal output outside the device; and a selection control that accepts a selecting operation of a user and selects one of "dry" or "wet" for each of the input channels. When the selection control selects "dry" for one of the input channels, the audio signal processing device controls itself to supply an audio signal having a characteristic controlled by the one input channel to the second mixing bus and controls the recording and editing device in the computer such that, as regards a track channel corresponding to a track for which a corresponding selecting device selects an audio signal inputted to the one input channel as an audio signal to input to the track, the track channel selects an audio signal to be reproduced in the track to control the characteristics of the audio signal. When the selection control selects "wet" for one of the input channels, the audio signal processing device controls itself to stop supplying the audio signal having a characteristic controlled by the one input channel to the second mixing bus and controls the recording and editing device in the computer such that, as regards a track channel corresponding to a track for which a corresponding selecting device selects an audio signal inputted to the one input channel as an audio signal to input to the track, the track channel selects an audio signal to be inputted to the corresponding track to control the characteristics of the audio signal.

The above and other objects, features and advantages of the invention will be apparent from the following detailed description which is to be read in conjunction with the accompanying drawings.

BRIEF DESCRIPTION OF THE DRAWINGS

FIG. 4 is a diagram showing a correspondence between supply sources of waveform data and output ports in the digital mixer shown in FIG. 1;

FIG. 5 is a diagram showing a correspondence between supply sources of waveform data and output ports in the DAW application shown in FIG. 1;

DETAILED DESCRIPTION OF THE PREFERRED EMBODIMENTS

Hereinafter, preferred embodiments of the invention will be concretely described with reference to the drawings.

Figure 1:
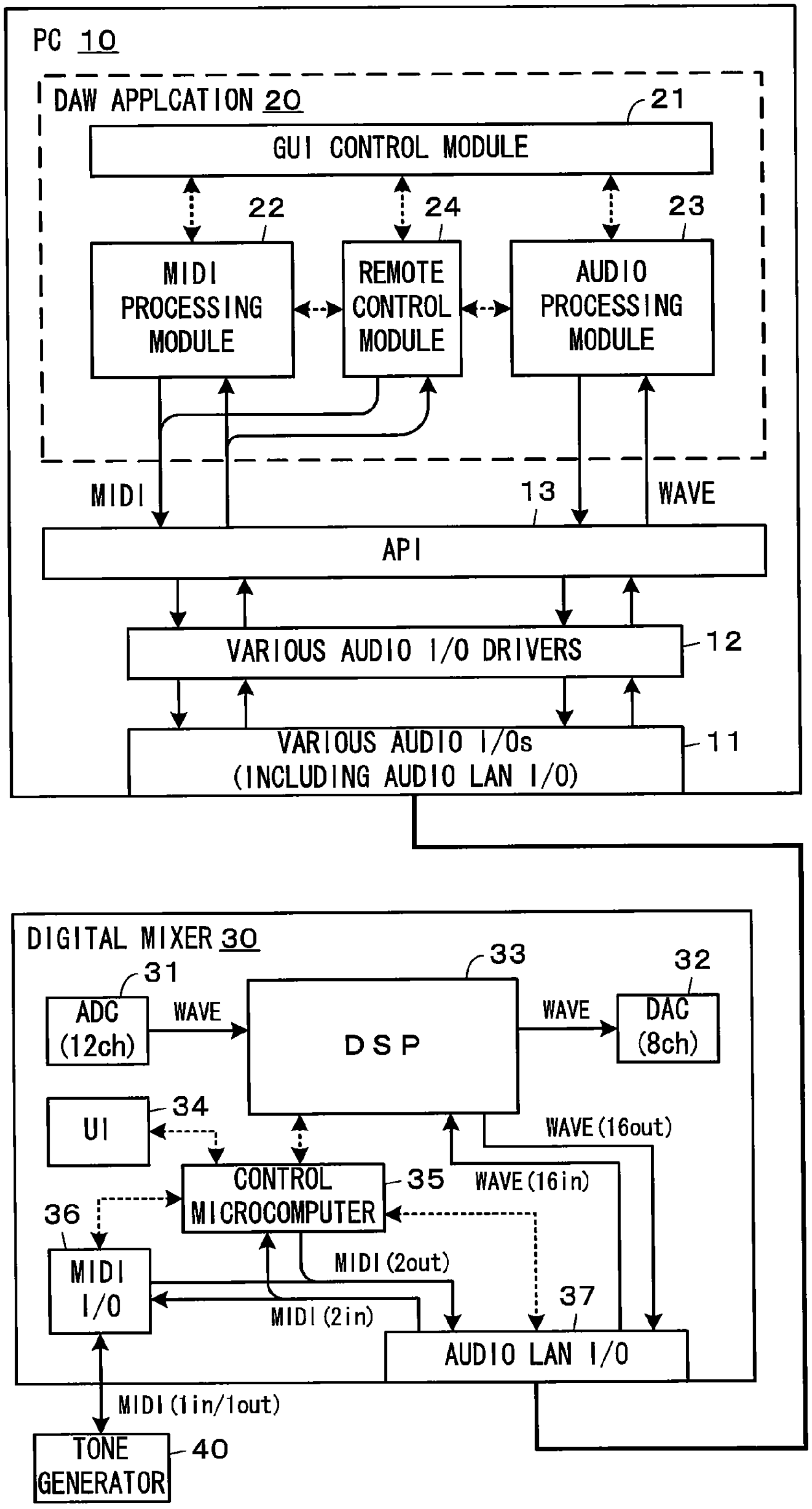
FIG. 1 is a block diagram showing a functional configuration of a PC and a digital mixer constituting a mixer system as an embodiment of an audio signal processing system of the invention.

FIG. 1 shows a functional configuration of a PC and a digital mixer, constituting a mixer system as an embodiment of an audio signal processing system of the invention. Here, FIG. 1 simply shows a function related to an audio signal processing.

As shown in FIG. 1, according to the present embodiment, a PC 10 as a general-purpose computer and a digital mixer 30 as an audio signal processing device are connected to transmit and receive data to and from each other and constitute a mixer system.

The PC 10 includes various audio I/Os (input and output units) 11, various audio I/O drivers 12, an API (Application Program Interface) 13 and a DAW (Digital Audio Workstation) application 20. Except for the various audio I/Os 11, those are functions realized by software. As hardware, the system can employ conventional devices such as a CPU, ROM, RAM, HDD (Hard Disk Drive) and communication interface.

The various audio I/Os 11 are interfaces for transmitting and receiving data such as waveform data in an audio format, performance data in an MIDI (Musical Instruments Digital Interface) format and a command instructing a particular operation to a destination device. Concretely, for example, the system can employ an interface of IEEE 1394 (Institute of Electrical and Electronic Engineers 1394) standard for mLAN communications, which is an audio data communication standard proposed by Yamaha Corporation. Further, the system can employ the USB (Universal Serial Bus) standard, the Ethernet (registered trademark) standard and the like. In addition to the above, the system can include an ADC or a DAC, which are similar to a later described digital mixer 30.

The various audio I/O drivers 12 has a function to control operations of the various audio I/Os 11. The function is realized by executing appropriate programs by the CPU.

The API 13 is a program interface in an OS (Operating System) and used when operating an application program.

The DAW application 20 has a function as a second signal processor for, according to a user's operation, recording inputted waveform data or performance data, reading the recorded waveform data or performance data to output (reproduce), generating waveform data based on performance data (automatic performance), or performing mixing, equalizing or effect addition on the waveform data (signal processing). These functions are realized by executing proper application programs by the CPU.

Further, the DAW application 20 is an application program for producing music compositions having a configuration with a plurality of tracks. The waveform data or various settings related to recording, reproducing, automatic performance and signal processing composes a song as a tune. The data of the song can be stored to an HDD of the PC 10 as a song file and read from the HDD.

More concretely, the DAW application 20 includes a GUI (Graphical User Interface) control module 21, an MIDI processing module 22, an audio processing module 23 and a remote control module 24.

The GUI control module 21 displays a GUI on a display to accept a user's operation and displays various information of the DAW application 20, such as set contents, operation states and contents of data to be processed.

The MIDI processing module 22 processes MIDI performance data for recording, reproduction or automatic performance.

The audio processing module 23 processes audio waveform data for recording, reproduction or signal processing.

The recording and reproduction in the MIDI processing module 22 and audio processing module 23 can be performed in the plural tracks on a track-to-track basis. In other words, pieces of data of plural channels, which are input from the digital mixer 30, can be individually inputted to different tracks to record, or pieces of data reproduced in the plural tracks can be outputted to individually set destinations to input the pieces of data to individual channels of the digital mixer 30.

The detail description of the configuration of the audio processing unit 23 will be given later.

The remote control module 24 interprets a command sent from the digital mixer 30 and modifies the set contents in the DAW application 20, and starts or stops operations, according to the interpretation. Further, when a particular operation is performed to the DAW application 20 in the PC 10, the remote control unit 24 sends a command according to the operation to the digital mixer 30 to let the digital mixer 30 operate according to the command.

The operation of the DAW application 20 can be operated by operating device such as a keyboard or a mouse provided to the PC 10 and, in addition, the function of the remote control module 24 allows a remote control of the DAW application 20 using controls provided in an externally provided digital mixer 30. Inversely, remote control of the digital mixer 30 can be performed by the operating device of the PC 10. Further, the DAW application 20 and the digital mixer 30 can cooperate, for example, to modify related set contents or carry out related operations at the same time.

Next, the digital mixer 30 will be described. The digital mixer 30 includes ADCs (analogue-digital converters) 31, DACs (digital-analogue converters) 32, a DSP (digital signal processor) 33, a UI (user interface) 34, a control microcomputer 35 and a MIDI I/O 36 and an audio LAN I/O 37.

The ADCs 31 are interfaces for converting an analogue audio signal inputted from outside into a digital signal (waveform data) to supply to the DSP 33. Twelve ADCs 31 respectively corresponding to twelve channels are provided.

The DACs 32 are interfaces for converting the digital waveform data processed by the DSP 33 into an analogue audio signal to output. Eight DACs respectively corresponding to eight channels are provided.

The DSP 33 is a first signal processor for performing signal processing such as equalizing, mixing or level adjusting to the input digital waveform data and outputting the processed waveform. The equalizing and level adjusting can be carried out individually in each of the plural channels. The processed waveform can be outputted individually from each channel or after mixing waveforms of the plurality of channels.

The functional configuration of the signal processing in the DSP 33 will be described later in detail.

The UI 34 includes various controls for accepting user's operation and displays showing information to the user and, in this embodiment, those are provided on an operation panel. This UI 34 accepts user's instruction and displays set contents, contents of signal being processed or operation state in the digital mixer 30.

The control microcomputer 35 is a controller, which includes a CPU, a ROM, a RAM and the like and controls the operations of the digital mixer 30, for example, instructing parameter setting or an operation to the DSP 33, controlling operation detection or display in the UI 34, and controlling communications via the MIDI I/O 36 or the audio LAN I/O 37.

The MIDI I/O 36 is an interface for transmitting and receiving MIDI data to and from an external device such as a tone generator 40 and a synthesizer. In this example, the MIDI I/O 36 is capable of transferring only data of one channel for both outputting and inputting.

The audio LAN I/O 37 is an interface for sending and receiving data such as waveform data, performance data or a command to and from an external device (the PC 10, in this example). The audio LAN I/O 37 employs standards of hardware and communications corresponding to those in the PC 10.

In the mixer system shown in FIG. 1, the digital mixer 30 can independently process audio signals inputted from the ADCs 31 and output the signals from the DACs 32, and the PC 10 can independently process the waveform data recorded in the HDD and record the processed data. In addition, the PC 10 (the DAW application 20) and the digital mixer 30 can work together to provide the following operations, for example.

(a) Audio signals inputted from the ADCs 31 or audio signals received from the PC 10 are processed in the digital mixer 30, and then, sent to the PC 10 to be recorded.

(b) Audio signals inputted from the ADCs 31 are sent to the PC 10 with few processing and the PC 10 processes the signals before recording the signals. Further, the recorded signals are sent back to the digital mixer 30 and outputted from the DACs 32.

The configuration related to these operations will be described in more detail.

Figure 2:
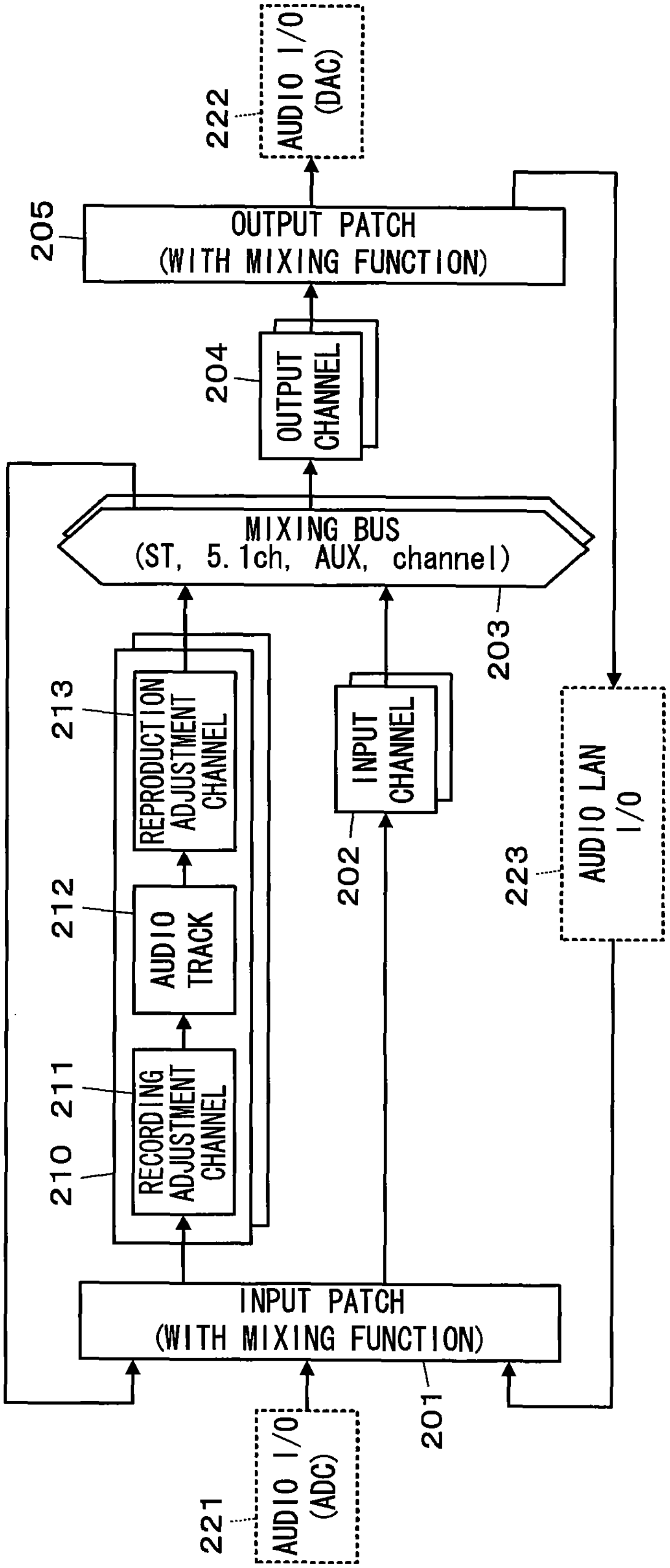
FIG. 2 is a diagram showing a functional configuration of an audio processing module in a DAW application shown in FIG. 1.

FIG. 2 shows a functional configuration of the audio processing module 23 in the DAW application 20. In FIG. 2, the I/Os defined by broken lines are not included in the DAW application 20, and the other parts except for the I/Os are functions realized by software.

As shown in FIG. 2, the audio processing unit 23 includes an input patch 201, an input channel 202, a mixing bus 203, an output channel 204, an output patch 205 and a track 210 for recording and reproducing.

The input patch 201 allocates waveform data inputted from an audio I/O 221 by ADCs, an audio LAN I/O 223 (both of which compose the various audio I/O 11 in FIG. 1), and the mixing bus 203 to one of the input channel 202 and track 210 to transmit data according to the allocation. This allocation and transmission is a logical connection. The content of the logical connection is previously set based on a later described connection template when a new song is created with the DAW application 20. However, the set content can arbitrarily be modified by the user. The input patch 201 also mixes data to input data of plural channels to a single channel or track; however, the connection is made one by one in general.

The input channel 202 performs processing such as equalizing, level adjusting, effect adding on the inputted waveform data and outputs the processed data. Regarding the effect addition, the function can also be added by plug-in. The processed data is outputted to one or more selected buses of the mixing bus 203. The output destination can be set by the user. Further, any number of input channels 202 can be provided within the hardware capacity of the PC 10.

The track 210 for recording and reproducing includes a recording adjustment channel 211, an audio track 212 and a reproduction adjustment channel 213. With the audio track 212, the input waveform data is recorded and the recorded waveform data is read to output. A monitor output operation for directly outputting recorded waveform data is also available.

The recording adjustment channel 211 includes the same configuration as that of the input channel 202 and performs processing such as equalizing or level adjusting on the waveform data inputted to the track 210 before recording the data in the audio track 212. The reproduction adjustment channel 213 also includes the same configuration as that of the input channel 202 and performs processing such as equalizing or level adjusting on waveform data (including monitor output) outputted from the audio track 212 before outputting from the track 210. Also in these channels, plug-in effect is available.

The signal processed in the reproduction adjustment channel 213 is output to one or more selected buses in the mixing bus 203. The output destination can be set by the user. Further, any number of tracks 210 can be provided within the hardware capacity of the PC 10.

The mixing bus 203 outputs the waveform data inputted from the input channel 202 or the track 210 to the input patch 201 or output channel 204. Further, when data is inputted from a plurality of channels or tracks to a single bus, the mixing bus 203 mixes the data before outputting. Further, as the mixing bus 203, there are some kinds of buses such as stereo output bus (ST), 5.1 channel output bus (5.1ch), AUX output bus (AUX) and monaural output bus (channel), and any of those buses can be selected and employed.

The ST bus and AUX bus are sets of two buses of L and R, and the 5.1ch bus is a set of six buses of L, R, C, LFE, Ls and Rs. When the busses are designated as output destinations by the input channel 202 or the track 210, the buses are designated on a set basis. The waveform data outputted from the input channel 202 or the track 210 is allocated to each bus of the set according to the setting in a sound image localization. The AUX bus is often used with a main mixing for, for example, mixing signals to be sent to an external effector. Accordingly, waveform data is supplied to the AUX bus regardless of the setting of output destinations specified in the track 210. It is noted that these buses are second buses and only one set can be provided, respectively.

The channel bus is an independent bus and each bus independently inputs and outputs data. Father, any number of channel buses can be provided within the hardware capacity of the PC 10.

The output channel 204 is provided corresponding to each bus composing the mixing bus 203 and performs processing such as equalizing or level adjusting on the waveform data outputted from the DAW application 20 and outputs the processed data. The output channel 204 also has a configuration same as that of the input channel 202 and plug-in effect is available. Then, the output patch 205 allocates the processed data to one of output modules.

The output patch 205 allocates waveform data processed by each output channel 204 to one of the audio I/O 222 by DACs and audio LAN I/O 223 (both of which compose the various audio I/O 11 in FIG. 1) to transmit data according to the allocation. This allocation and transmission is a logical connection. The content of the logical connection is, similar to the input patch 201, previously set based on a later described connection template and the set content can arbitrarily be modified by the user. Since the logical connection for the waveform data outputted from the audio LAN I/O 223 needs to correspond to the configuration of the destination device, it is possible to prohibit its modification. Further, when plural busses are connected to the same port, the output patch 205 mixes the waveform data outputted from those busses before supplying to the port.

The number of ports being able to use for transmission depends on the hardware capacity of the PC 10, the communication path standard used for the transmission, the capacity of the receiver, and the like. In this example, regarding the waveform data, the digital mixer 30 has a transmission capacity for sixteen ports and reception capacity for sixteen ports so the audio LAN I/O 223 sends waveform data from sixteen sources of ports P1 to P16.

Figure 3:
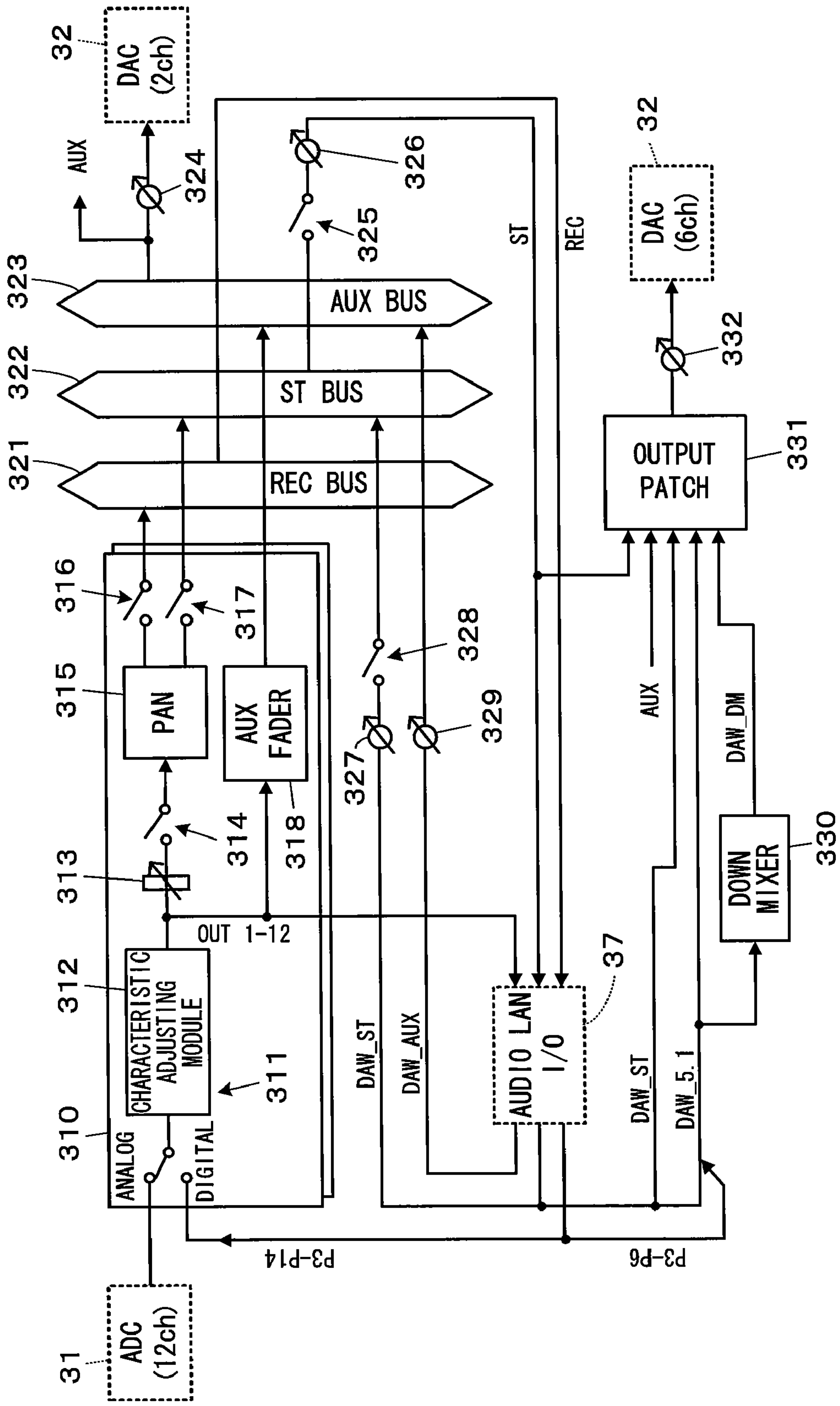
FIG. 3 is a diagram showing a functional configuration of a DSP in the digital mixer shown in FIG. 1.

FIG. 3 shows a functional configuration of the DSP 33 in the digital mixer 30. In FIG. 3, the I/Os defined by the broken lines are not included in the DSP 33. Further, each function of the DSP 33 can be realized any of dedicated hardware or software with a programmable processor.

As shown in FIG. 3, the DSP 33 includes input channels 310, a recording (REC) bus 321, a stereo (ST) bus 322, an AUX bus 323, an AUX output fader 324, a ST output ON switch 325, a ST output fader 326, a ST input fader 327, a ST input ON switch 328, an AUX input fader 329, a down mixer 330, an output patch 331, and an output fader 332.

As regards the input channels 310, twelve channels are provided corresponding to the twelve channels of the ADCs 31 shown in FIG. 1. The respective input channels 310 perform processing such as equalizing and level adjusting on the inputted waveform data. The input source of the waveform data can be selected from the ADCs 31 and the audio LAN I/O 37 in every channel, and the processed data is directly outputted to each of the various buses and the audio LAN I/O 37.

Such an input channel 310 includes an input changeover switch 311, a characteristic adjusting module 312, a channel fader 313, a channel ON switch 314, a pan 315, a REC send ON switch 316, a ST send ON switch 317 and an AUX fader 318.

The input changeover switch 311 is a first selecting device for switching the inputting source of the waveform data between the ADCs 31 and the audio LAN I/O 37. When selecting the ADCs 31, waveform data supplied to a particular ADC corresponding to the channel from outside as an analogue signal is inputted to the input channel 310. When selecting the audio LAN I/O 37, waveform data received as a digital signal by a particular port of the audio LAN I/O 37 corresponding to the input channel 310 is inputted. Here, when there are no digital signals, the system for analogue signal can be selected compulsory.

The characteristic adjusting module 312 performs processing such as an equalizer, filter or compressor on input waveform data. The signal processed in the characteristic adjusting unit 312 is supplied to the audio LAN I/O 37 as a direct out output and transmitted to the DAW application 20 of the PC 10, and further, the signal is also outputted to the various busses after some other processes.

The channel fader 313 adjusts the level of waveform data outputted from the input channel 310 to the REC bus 321 and ST bus 322. The channel ON switch 314 adjusts ON and OFF of the waveform data. The pan 315 adjusts the sound image localization position of the waveform data. The waveform data is divided into L and R systems by the pan 315.

The REC send ON switch 316 and the ST send ON switch 317 respectively have a function for controlling whether or not the waveform data is outputted from the input channel 310 to the REC bus 321 and ST bus 322.

The AUX fader 318 has a function for adjusting the level of waveform data outputted from the input channel 310 to the AUX bus 323 in L and R busses independently.

Further, the REC bus 321, ST bus 322 and AUX bus 323 are respectively mixing buses composed of a pair of L and R buses and have functions for mixing the data input from each input channel 310 and audio LAN I/O 37 separately in the L and R busses and outputting the mixed data to a predetermined output destination. The output destination of the REC bus 321 is the audio LAN I/O 37, the output destination of the ST bus 322 is the audio LAN I/O 37 and the output patch 331, and the output destination of the AUX bus 323 is the output patch 331 and AUX outputting DAC 32. Further, in this example, the ST bus 322 is the first bus.

The AUX output fader 324 adjusts the level of waveform data outputted from the AUX bus 323 to the DACs 32.

The ST output ON switch 325 and the ST output fader 326 respectively adjust ON/OFF of the output and the level of the outputted waveform data from the ST bus 322.

The ST input fader 327 and the ST input ON switch 328 respectively adjust the level and ON/OFF of the signal inputted from the audio LAN I/O 37 to the ST bus 322.

The AUX input fader 329 adjusts the level of the signal inputted from the audio LAN I/O 37 to the AUX bus 323.

The down mixer 330 down-mixes the waveform data inputted from the ports P1 to P6 of the audio LAN I/O 37, which correspond to the 5.1ch buses of the DAW application 20, from 5.1 channel data to ST data. Here, it is not required to determine whether or not the waveform data inputted form the ports P1 to P6 is actually the waveform data of 5.1 channels. This is because, even when non-related waveform data is down-mixed, there will be no problem if the output patch 331 does not select the data to output.

The output patch 331 selects a signal to output from the DAC 32 for monitor output from several options. The options are: an output from the ST bus 322, an output from the AUX bus 323, an output from the ST bus of the DAW application 20 received by the audio LAN I/O 37, an output from the 5.1ch bus of the DAW application 20 received by the audio LAN I/O 37, and an output down-mixed by the down mixer 330. The user can decide and set which is to be selected from the above. It is noted that the DAC 32 for monitor output includes six channels; however, all of the six channels are used only when the output of the 5.1ch bus is selected and only two of them are used in other cases.

The output fader 332 adjusts the level of the waveform data selected by the output patch.

The above described DSP 33 outputs waveform data supplied from sixteen channels in total, from the audio LAN I/O 37 to the external device (the DAW application 20 of the PC 10, in this example), the sixteen channels including each of the twelve input channels 310, two of the L and R channels of the ST bus 322 and two of the L and R channels of the AUX bus 323. For this process, the sixteen ports P1 to P16 are used.

FIG. 4 shows a correspondence between waveform data sources and output ports.

In the digital mixer 30, from where the waveform data is supplied to each of the output ports (source) and to where the waveform data from each of the input ports is supplied (destination) are fixedly designed and users are not allowed to modify the correspondence. Thus, the DAW application 20 having a logic connection to the digital mixer 30 can recognize a channel or a bus of the digital mixer 30 which is a source of the received waveform data with its port number, based on the correspondence.

On the other hand, as described with reference to FIG. 2, the DAW application 20 also sends waveform data with the sixteen ports P1 to P16 to the digital mixer 30 via the audio LAN.

The DSP 33 handles the waveform data received via the ports P1, P2 as an output of the ST bus of the DAW application 20 and inputs the data to the ST bus 322 and the output patch 331 of the digital mixer 30. The DSP 33 also handles the waveform data received via the ports P1 to P6 as an output from the 5.1ch bus of the DAW application 20 and inputs the data to the output patch 331 and the down mixer 330. Further, the DSP 33 handles the waveform data received via the ports P3 to P14 as an output from the channel bus of the DAW application 20 and supplies as digital inputs to each of the twelve channel busses 310 as digital signals. Furthermore, the DSP 33 handles the waveform data received via the ports P15, P16 as an output from the AUX bus of the DAW application 20 and supplies the data to the AUX bus 323 of the digital mixer 30.

FIG. 5 shows a correspondence between the waveform data sources and output ports. The DAW application 20 having a logical connection to the digital mixer 30 can recognize a channel or a bus of the digital mixer 30 which is a destination of the transmitting waveform data with its port number, based on the correspondence.

As seen in FIG. 3 and FIG. 5, the digital mixer 30 sometimes handles waveform data received from a single port as a plurality of different kinds of waveform data redundantly. Concretely, the digital mixer 30 handles the data from the ports P1, P2 as both an output of the ST bus and an output from the L and R of the 5.1 bus of the DAW application 30. Further, the digital mixer 30 handles the data from the ports P3 to P6 as both an output of C, LFE, Ls, Rs of the 5.1 bus and an output of the first to fourth channel buses of the DAW application 20. Then, in the DAW application 20, the output patch 205 performs a logic connection to send data from a single port by mixing different kinds of bus outputs.

In this regard, without proper settings of both the DAW application 20 and the digital mixer 30, a desired operation cannot be obtained or an error can occur in the operation thereof. However, in this example, a dedicated control is provided to the digital mixer 30 and, with the control, proper and desired settings can be set in both the DAW application 20 and the digital mixer 30. One example of the settings is not to simultaneously output waveform data to the ST bus and 5.1ch bus. With such a setting, errors can be prevented in general. The location and function of the controls for this purpose will be described later.

Next, the user interface for accepting operation related to the functions, which have been described with reference to FIGS. 2 to 5, will be described.

Figure 6:
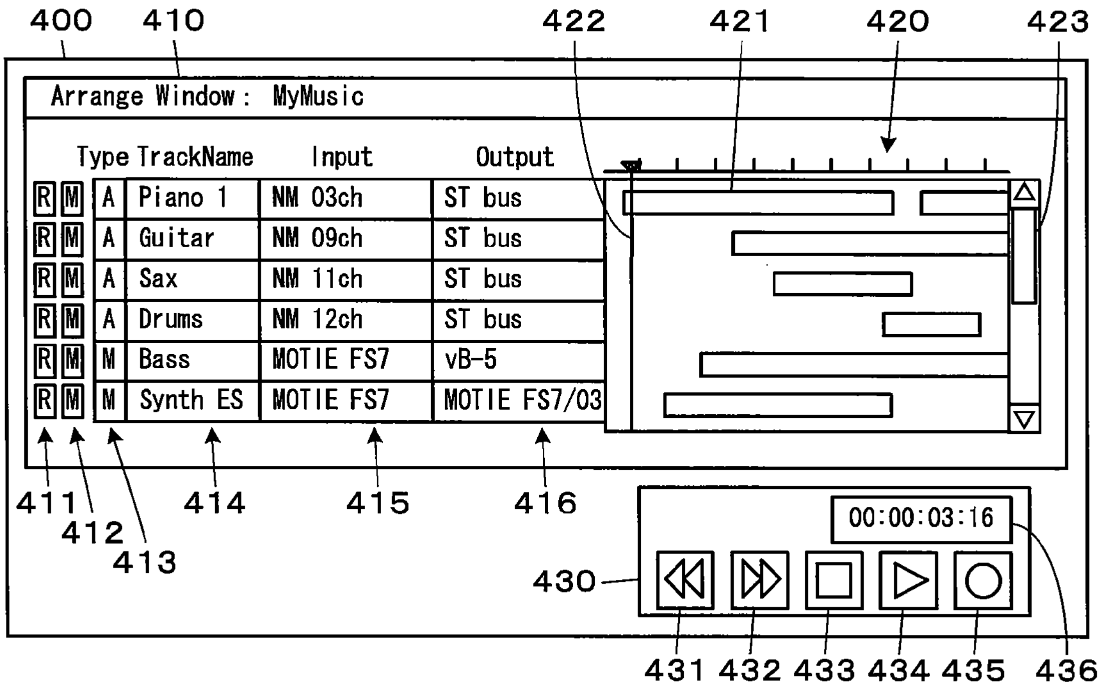
FIG. 6 is a diagram showing an example of a track control GUI in the DAW application shown in FIG. 1.

FIG. 6 shows a display example of a track control GUI of the DAW application 20.

The PC 10 basically accepts operations related to the DAW application 20 from the GUI shown on the display by the GUI control module 21. FIG. 6 shows an example of the GUI, which shows a track setting window 410 and a recording and reproducing window 430 on a screen 400 of the display.

The track setting window 410 is a screen to perform setting related to the tracks 210 shown in FIG. 2. The track setting window 410 includes a one-line length setting and displaying field for each recording and reproducing track 210 to be created, in order to accept settings of the corresponding recording and reproducing tracks 210 and display the information.

In each field, a recording standby button 411, a monitor button 412, a type display portion 413, a name set portion 414, an input source set portion 415 and an output destination set portion 416 are provided.

The recording standby button 411 is a button for switching by toggling between a recording standby state and a released state of each track. The monitor button 412 is a button for switching by toggling between monitor output ON and OFF of each track.

When it is instructed to start recording (when a recording button 435 is turned on and then a start button 434 is turned on), the recording at the tracks 210 which are in a recording standby state is started. The waveform data inputted to those tracks is recorded. Further, reproduction at the tracks 210 which are not in a muted state (reproduction off) among other tracks 210 is started, and recorded waveform data is read out and outputted from those tracks. On the other hand, when it is instructed to start reproducing (when the recording button 435 is turned off and then the start button 434 is turned on), reproduction at the tracks 210 which are not in a muted state is started, and recorded waveform data is read out and outputted from those tracks. A monitor output function is always turned on regardless of states of stopping, recording or reproducing, and the waveform data inputted for recording is outputted from the track 210 having monitor output turned on.

The type display portion 413 is a display portion for displaying whether the type of the track 210 is an audio track (A) for audio data or an MIDI track (M) for MIDI data. The type of each track is determined when it is created and cannot be changed. Accurately, the tracks 210 shown in FIG. 2 are all audio tracks and an MIDI track is provided in the MIDI processing module 22 shown in FIG. 1.

The name set portion 414 is a region for inputting and setting names of the tracks 210.

The input source set portion 415 is a region for setting an input source, for each track, to be connected to the track 210 by the input patch 201. In case of an audio track, generally, names or numbers of the prepared audio I/O 221, audio input ports of audio LAN I/O 223, and buses composing the mixing bus 203 in the PC 10 are shown as pull-down menu options, and a port or a bus to be an input source is selected from the portions. However, the DAW application 20 having a logical connection to an audio signal processing device such as the digital mixer 30 can specify a supply resource in the audio signal processing device which sends data to each of the audio input ports, according to a correspondence as shown in FIG. 4, so that in the pull-down menu, the names of supply sources can be shown as substitute for the port names and port numbers of the audio input ports.

The output destination set portion 416 is a region for setting an output destination of waveform data from the tracks 210 for each track. In case of an output destination of the an audio track, names or numbers of the prepared audio I/O 222, audio output ports of the audio LAN I/O 223, and buses composing the mixing bus 203 are shown in a pull-down menu, a port or a bus to be an output destination is selected from the portions. However, the DAW application 20 having a logic connection to an audio signal processing device such as the digital mixer 30 can specify a supply destination in the audio signal processing device from each of the audio output port based on a correspondence as shown in FIG. 5, so that in the pull-down menu, names of the supply destinations can be shown as substitute for port names and port numbers of the audio output ports.

In the example shown in FIG. 6, input sources of the first four tracks 210 are respectively set to 3rd, 9th, 11th and 12th input channels in the digital mixer 30, and output destinations of all those tracks are set to ST bus.

In case of the MIDI track, its input source is assumed to be an electronic musical instrument compatible with MIDI or a sequencer, and its output destination is assumed to be a sound generating device in addition to the above. However, the intimate explanation thereof is omitted.

The track setting window 410 also has a track content indicator 420.

The track content indicator 420 is a portion indicating a data storage condition and a recording and reproducing status in each track. The abscissa axis represents time. Bars 421 represent time periods of recorded data. A cursor 422 indicates a portion to start recording or reproducing or an executing position. Further, a slider 423 and scroll buttons above and under the slider 423 are used to change tracks shown in the track setting window 410.

The recording and reproducing window 430 is a window for accepting an operation to start and stop recording or reproducing. Then, a fast-rewind button 431 and a fast-forward button 432 are used to instruct to execute a fast-rewinding and a fast-forwarding. A stop button 433 is used to instruct to stop reproducing, recording, fast-rewinding and fast-forwarding. A start button 434 is used to instruct to start reproducing and recording. A recording button 435 is used to switch, by toggling, the function of pressing the start button 434 between start of reproducing and start of recording. A recording and reproducing position indicator 436 is a portion for showing the position indicated by the cursor 422 as time from the begging of the track.

Figure 7:
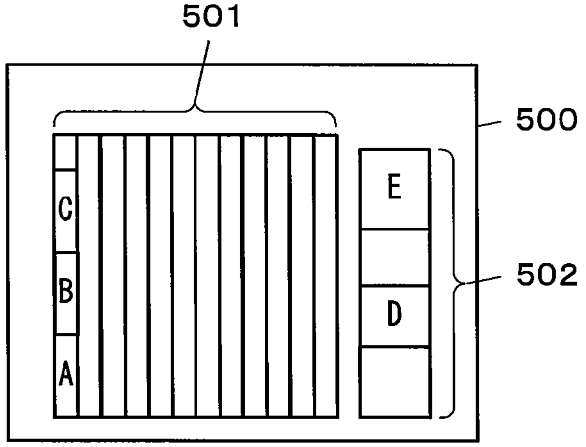
FIG. 7 is a diagram showing a schematic configuration of an operation panel of the digital mixer shown in FIG. 1.

FIGS. 7 and 8A to 8E show a configuration of an operation panel of the digital mixer 30. FIG. 7 shows its outline and FIGS. 8A to 8E show details of each part.

As shown in FIG. 7, the operation panel 500 of the digital mixer 30 includes a channel strip section 501 composed of controls for setting parameters of the respective channels of the input channel 310 and a general setting section 502 composed of controls for setting other parts. In the channel strip section 501, a set of controls arranged in tandem corresponds to one channel and the same sets of controls are provided for twelve channels.

FIGS. 8A to 8E show controls represented by letters A to E in FIG. 7. Buttons described below have lamps as corresponding displays for turning on, turning off and blinking the lamps to indicate values of parameter set by the buttons.

Figure 8A:
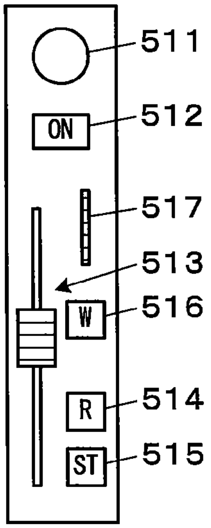
FIGS. 8A to 8E are diagrams showing details of the operation panel.

FIG. 8A shows a configuration of the portion A. In this portion, provided are a pan knob 511 for setting the sound image localization position by the pan 315 shown in FIG. 3, an ON button 512 for setting ON or OFF of the channel ON switch 314, a fader 513 for setting a level adjusting value by the channel fader 313, a REC ON button 514 for setting ON or OFF of the REC send ON switch 316, and an ST ON button 515 for setting ON or OFF of the ST send ON switch 317. Further, a WET button 516 is a button for switching later described WET mode and DRY mode. A level meter 517 is a meter for indicating a level of a signal inputted to a corresponding input channel 310.

Figure 8B:
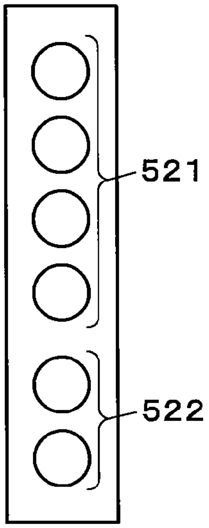

FIG. 8B shows a configuration of the portion B. In this portion, provided are an equalizer knob 521 for setting a characteristic of an equalizer of the characteristic adjusting module 312 and an AUX level knob 522 for setting a level adjusting value of the AUX fader 318.

Figure 8C:
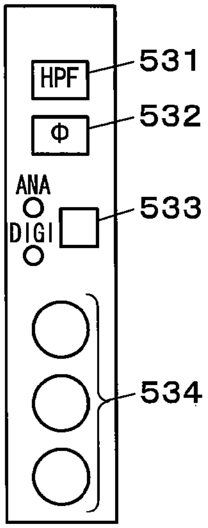

FIG. 8C shows a configuration of the portion C. In this portion, provided are an HPF button 531 for setting an effective/disabled of a high pass filter (HPF) of the characteristic adjusting unit 312, a phase inversion button 532 for switching ON and OFF of a phase inversion process in the characteristic adjusting unit 312, an input changeover button 533 for selecting analogue or digital at the input changeover switch 311, and a compressor knob 534 for setting a characteristic of a compressor in the characteristic adjusting unit 312.

Figure 8D:
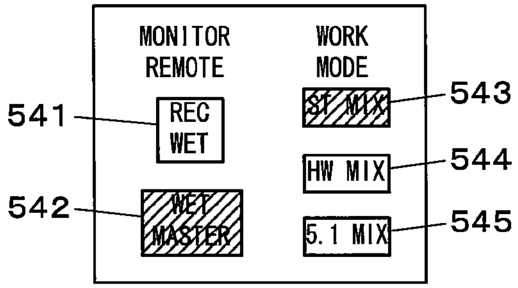

FIG. 8D shows a configuration of the portion D. In this portion, provided are controls for performing setting in the digital mixer 30 in association with the setting of the DAW application 20. A REC WET button 541 is a button for instructing a WET mode (a mode of inputting an output of the REC bus 321 to the ST bus 322 via the DAW application 20) of the REC bus 321. A WET master button 542 is a button for instructing a WET mode to all channels at once. A ST (stereo) MIX button 543, a HW (hardware) MIX button 544, and a 5.1 MIX button 545 are work mode buttons for performing setting, with a single operation, suitable for the case of mixing in the ST bus in the DAW application 20, the case of mixing in the digital mixer 30 and the case of mixing in the 5.1ch bus in the DAW application 20, respectively in order.

Figure 8E:
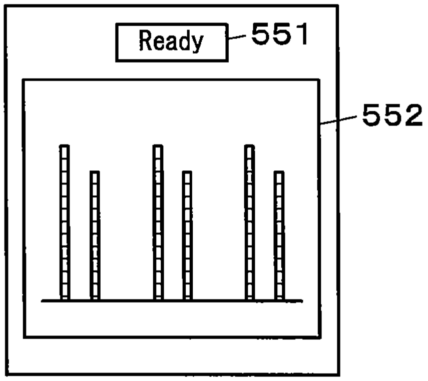

FIG. 8E shows a configuration of the portion E. In this portion, provided are a connection confirmation lamp 551 and a meter section 552.

The connection confirmation lamp 551 is a lamp for indicating whether or not the digital mixer 30 and the DAW application 20 are logically connected and the transmission and reception of data such as waveform data and command are available.

The meter section 552 is composed of a display to indicate a level of waveform data, which is being processed in each portion of the digital mixer 30.

Here, the logical connection between the digital mixer 30 and the DAW application 20 is descried with an assumption that a physical connection between the digital mixer 30 and the PC 10 (a connection with an audio LAN cable) and a logical connection between the digital mixer 30 and the PC 10 (a logical connection between ports of the audio LANs of the digital mixer 30 and the PC 10) are both established. In this condition, when the DAW application 20 is started on the OS of the PC 10 and the DAW application 20 is connected to a port of the PC 10 for transmitting audio LAN control signals, the control microcomputer 35 of the digital mixer 30 works as a synergetic controller so that the digital mixer 30 and the DAW application 20 can work in cooperation based on a correspondence as shown in FIGS. 4 and 5. This condition is referred as a condition in which a logical connection between the digital mixer 30 and the DAW application 20 is established.

It is noted that there exist plural controls on the general setting section 502 of the digital mixer 30 in addition to the above described controls. For example, provided are a selection control for selecting an input from inputs of five systems of the output patch 331, four level knobs respectively corresponding to the ST input fader 327, AUX input fader 329, ST output fader 326 and AUX output fader 324, and two ON buttons respectively corresponding to the ST input ON switch 328 and ST output ON switch 325.

Regarding the mixer system having the above described DAW application 20 and digital mixer 30, there are three characteristics as follows:

(1) indicating a presence or an absence of a logical connection by the connection confirmation lamp 551;

(2) collective setting of the settings in digital mixer 30 and DAW application 20 with the ST MIX button 543, HW MIX button 544, and 5.1 MIX button 545; and (3) switching between the WET mode and DRY mode with the WET button 516, REC WET button 541, and WET master button 542.

The processes in the CPU of the PC 10 and the control microcomputer 35 of the digital mixer 30, for realizing the above three functions, will be described. The following processes of the PC 10 are all performed by executing synergetic control programs installed in the DAW application 20. In order to simplify the explanation, the operations performed by executing the DAW application 20 and the above synergetic control programs by the CPU of the PC 10 will be described as operations performed by the DAW application 20.

A process related to the connection confirmation lamp 551 will be described with reference to FIGS. 9 to 11.

Figure 9:
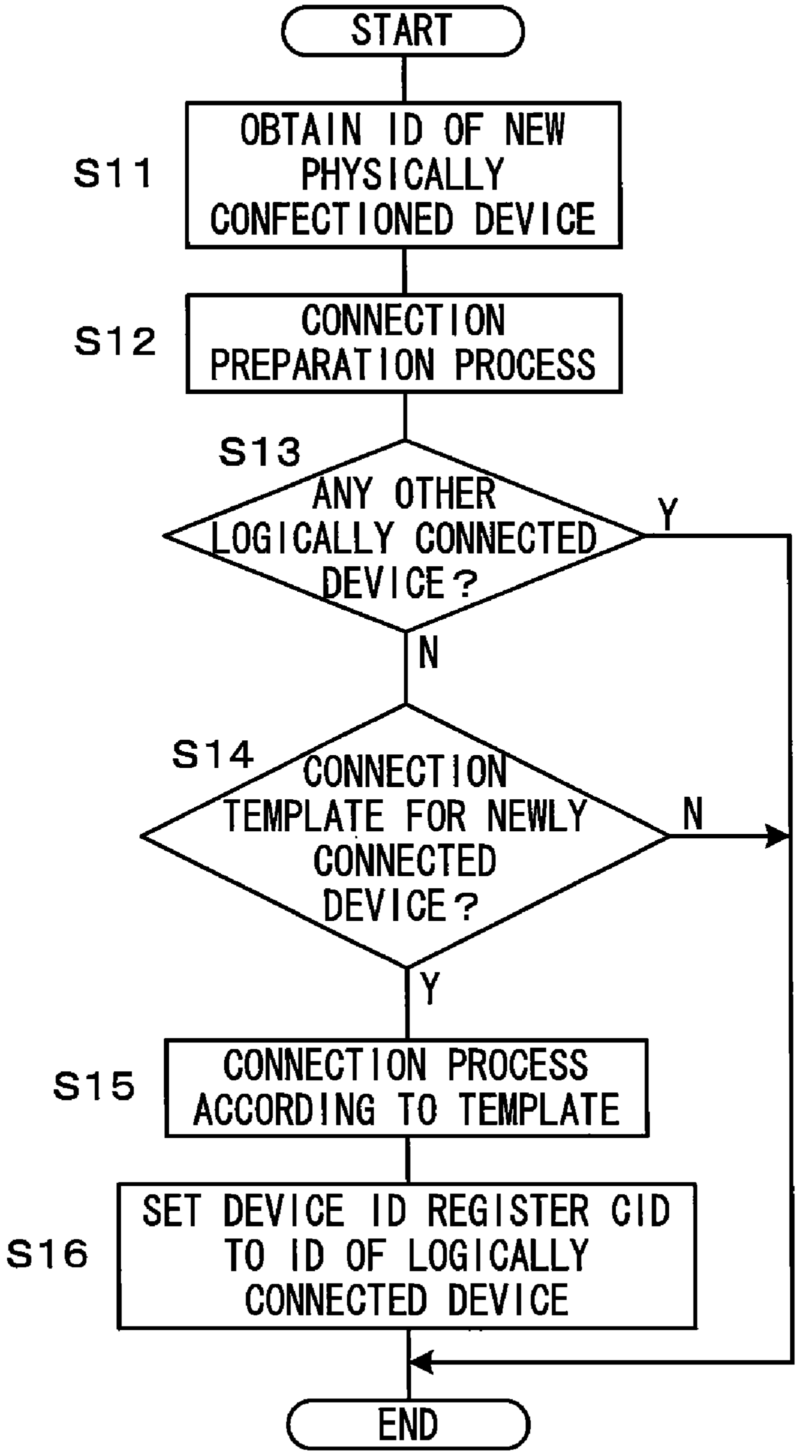
FIG. 9 is a flowchart of a process in the PC when detecting a new connection of a device.

FIG. 9 is a flowchart showing a process in the PC 10 when detecting a new connection of a device via an audio LAN. An audio LAN I/O driver installed in the PC 10 and the DAW application 20 share the work for this process in actual; however, to simplify the explanation, it will be described that the process is performed by the DAW application 20.

When detecting a new physical connection of a device (for example, the digital mixer 30) to the audio LAN I/O, the DAW application 20 starts the process shown in the flowchart of FIG. 9. A new connection is detected when the PC in which the DAW application 20 is activated is wired or wirelessly connected to an external device which is turned on, or when the DAW application 20 is activated or the external device is turned on under a condition being connected to each other.

Firstly, an ID of the newly connected device is obtained by an appropriate protocol for the communication path (S11). Then, a preparation for connecting is performed according to need (S12). In this process, some operations are performed such as, based on the device ID, searching and activating a synergetic control program for a synergetic operation with the device having the ID while searching and installing a connection template corresponding to the device. The synergetic control program is plug-in software to be installed in the DAW application 20 and works for transmitting and receiving control signals to and from a device having a predetermined ID and controlling a synergetic operation between the device and the DAW application 20. When a synergetic control program corresponding to the device ID is not found, the device cannot perform a synergetic operation with the DAW application 20 and, when a connection template corresponding to the device is not found, an automatic connection, which will be described below, cannot be performed.

After step S12, when there are no other logically connected devices and the connection template corresponding to the newly connected device is found (S13, S14), a connection process according to the template is performed (S15) and the ID of the logically connected device, that is the ID obtained in step S11, is set to a device ID register CID which shows an ID of logically connected device (S16). Then, the process is ended.

The connection template is a template prepared for logically connecting a device specified by the device ID and includes logical connection information between the PC 10 and the device in the audio LAN, logical connection information between the audio LAN I/O and the DAW application 20 in the PC 10, and correspondence information between each port of the connecting destination device or the DAW application 20 and the data (signal) supply source or supply destination, as shown in FIGS. 4 and 5.

An audio LAN I/O driver included in the various audio I/O driver 12 logically connects each port of the PC 10 and each port of the connecting destination device in the audio LAN based on the logical connection information of the audio LAN. As described above, the number of the ports of the PC 10 is adjusted corresponding to the number of ports in the connecting destination device. For example, when the digital mixer 30 is connected, based on a connection template, sixteen waveform data transmission lines for sixteen ports and one control signal transmission line from the PC 10 to the digital mixer 30, and sixteen waveform data transmission lines for sixteen ports and one control signal transmission line from the digital mixer 30 to the PC 10 are set.

Based on the logical connection information in the PC 10, a logical connection between the ports for two-way communication of control signals and the above described synergetic control program is established, and a default setting (initial state) of a new song including waveform data of the audio LAN I/O and logical connections between the respective ports of the MIDI data and the respective components in the DAW application 20 is determined. When a new song is created in the DAW application 20, the default setting is reflected and components and logic connections are set automatically.

For example, when the digital mixer 30 is connected, a song created as a new song includes, as components, twelve tracks 210 as tracks No. 1 to 12, a ST bus, a 5.1ch bus, an AUX bus, and twelve channel buses. In addition, input sources of the tracks No. 1 to 12 are set to input ports P1 to P12 of the audio LAN I/O 223 in the input patch 201. Further, in the output patch 205, output destinations of the output channels of the ST bus are set to output ports P1 and P2 of the audio LAN I/O 223; output destinations of the output channels of the 5.1 bus are set to output ports P1 to P5 of the audio LAN I/O 223; output destinations of the output channels of the AUX bus are set to output ports P15 and P16 of the audio LAN I/O 223; and output destination of the output channels of the twelve channel buses are respectively set to output ports P3 to P14 of the audio LAN I/O 223.

The set input sources and output destinations can be modified by the user arbitrary. However, the output destinations from the output channels of each bus are hardly changed, so the system is generally used with the default setting. Thus, in a broad sense, it can be the that the various ports of the PC 10 and each components of the DAW application are automatically connected according to the device newly connected to the audio LAN.

Since the existence of the buses and the logical connections between the buses and corresponding output ports are essential for a later described synergetic operation by the DAW application 20 and digital mixer 30, settings can be made compulsorily when the logical connection is established and not to be modified by the user until the logical connection is released.

Further, when there is another device which has been already logically connected with the DAW application 20 in step S13, since the current connection has priority over the new connection, the logical connection with the newly connected device is not performed and the process is ended.

When the answer is NO in step S14, it is determined that the newly and physically connected device is a device, which cannot be logically connected to the DAW application 20, and the process is ended without performing the logical connection process.

With the above described processes, when a proper connection template is stored, the PC 10 can perform a process for a logical connection between the external device and the PC 10 in the audio LAN, a logical connection between the ports of the audio LAN and the synergetic control program, and a logical connection between the port of the audio LAN and the tracks or buses of the DAW application 20. The condition, in which “a logical connection is established”, represents a condition, in which a logical connection in the audio LAN has been performed to communicate control signals between the external device and the synergetic control program, and a later described connection confirmation between the DAW application 20 and the external device has also been performed.

When the physical connection between the PC 10 and the external device is disconnected, data transmission in the audio LAN cannot be performed, and thus the audio LAN I/O driver cancels the various ports connected to the external device. In this case, the synergetic control program of the DAW application 20, the connections of tracks and buses to the absent ports are remained; however, communication cannot be performed.

Figure 10:
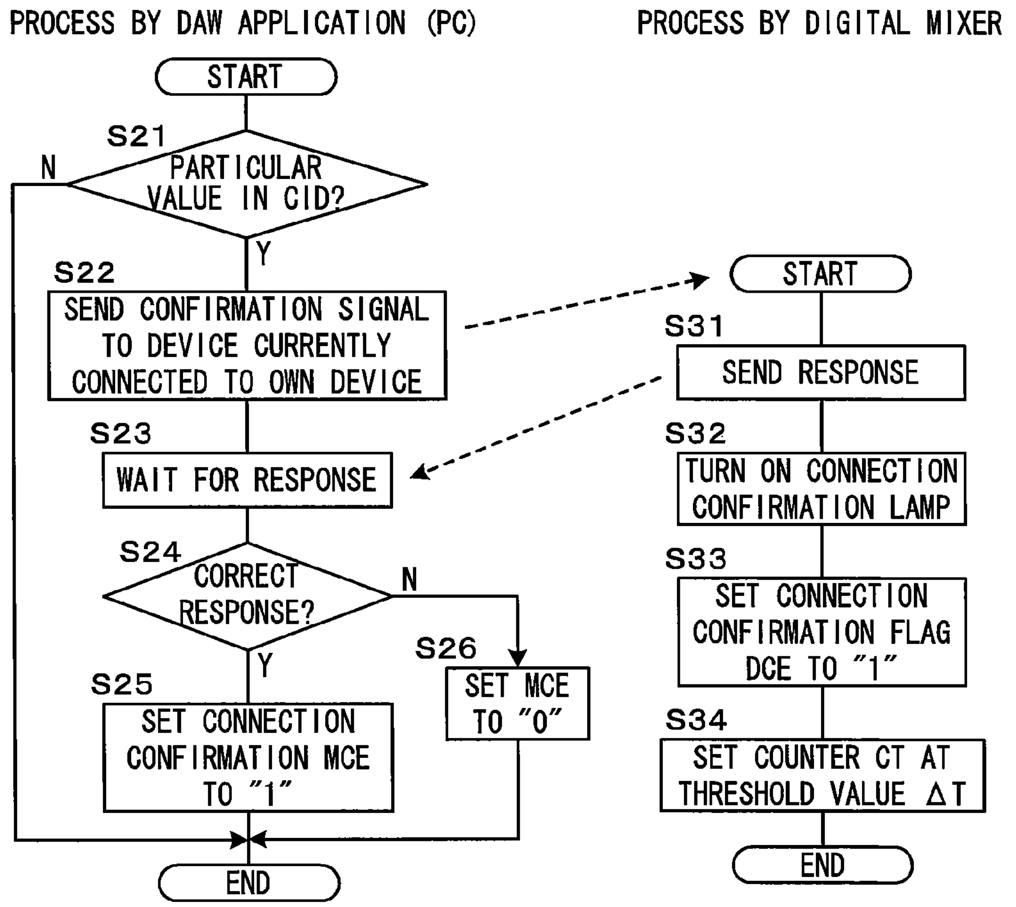
FIG. 10 is a flowchart of a connection confirmation process regularly implemented by the DAW application when the synergetic control program is active.

FIG. 10 shows a flowchart of a connection confirmation process regularly implemented by the DAW application 20 while the synergetic control program is activated.

The DAW application 20 regularly starts the process shown in the left flowchart of FIG. 10. The DAW application 20 refers to a value of the device ID register CID and, when it is an ID specifying a particular digital mixer for the connection confirmation (S21), the process proceeds to step S22 and the following steps to confirm that the logical connection is still maintained. When it is not the particular ID in step S21, it is not required to confirm the connection, so the process is ended.

In step S22 and the following steps, firstly, the DAW application 20 sends a confirmation signal to a device currently connected to the own device (S22). This transmission is performed using an output port for control signals.

When the confirmation signal is received, the digital mixer 30 starts the process shown in the right flowchart of FIG. 10 and sends a response for the confirmation signal to the DAW application 20 (S31). Then, since it is confirmed, with the reception of the confirmation signal, that the logical connection with the DAW application 20 is maintained, the connection confirmation lamp 551 shown in FIG. 8E is turned on (S32), and a connection confirmation flag DCE (S33) is set to “1” to indicate the maintenance of the logical connection. Further, the digital mixer 30 sets a monitoring counter CT at a predetermined threshold value ΔT (S34), and ends the process. The value ΔT is a value representing a period of time longer than the intervals of the connection confirmation process in the DAW application 20.

On the other hand, the DAW application 20 waits a response from the digital mixer 30 after the transmission of the confirmation signal (S23). When acquiring the correct response indicating that the device specified by the value of the device ID register CID is connected (S24), the DAW application 20 sets the connection confirmation flag MCE to “1” (S25) to indicate the maintenance of the logical connection, and ends the process. When a correct response is not acquired, the DAW application 20 sets the connection confirmation flag MCE to “0” (S26) to indicate the non-maintenance of the logical connection, and ends the process.

With the above described process, the DAW application 20 and the digital mixer 30 can regularly confirm the logical connection therebetween.

Additionally, in step S24, when a correct response is not received, the DAW application 20 immediately determines that the logical connection is lost; however, the DAW application 20 can repeat the process several times prior to determining the lost of the logical connection and setting the MCE to “0”. Further, the ΔT set in step S34 can be a period of time for several implementation intervals.

Figure 11:
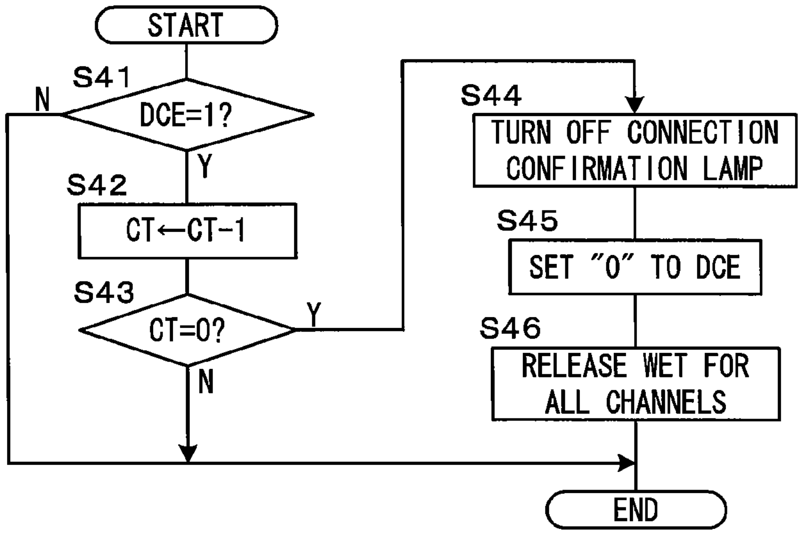
FIG. 11 is a flowchart of a connection confirmation process regularly implemented by the digital mixer.

FIG. 11 shows a flowchart of a connection confirmation process regularly implemented by the digital mixer 30.

The digital mixer 30 regularly starts the process shown in the left flowchart in FIG. 11. The digital mixer 30 refers to the value of the connection confirmation flag DCE and, when the value is “1” (S41), the digital mixer 30 decrements the counter CT by 1 (S42). Here, when the value of the counter CT becomes “0” (S43), it represents that the confirmation signal from the DAW application 20 is not received for a predetermined period of time, so the digital mixer 30 determines that the logical connection to the DAW application 20 is lost, and proceeds to step S44.

Then, the digital mixer 30 turns off the connection confirmation lamp 551 (S44), and sets the connection confirmation flag DCE to “0” (S45) to indicate the lost of the logical connection. Then, the digital mixer 30 switches the mode of all the channels to DRY mode from WET mode (described below), which uses a function of the DAW application 20 (S46), and ends the process.

When the counter CT is not “0” in step S43, the digital mixer 30 determines that the logical connection is not lost and ends the process. When the DCE is not “1” in step S41, it represents that the logical connection is not established, and the process is ended since the further processes are not necessary.

With the above process shown in FIG. 11 in addition to the process shown in the right flowchart of FIG. 10, the digital mixer 30 regularly confirms the logical connection to the DAW application 20 and indicates a presence or absence of the logical connection with the connection confirmation lamp 551 so that the user can easily recognize the condition of the connection. The settings such as collective settings by the STMIX button 543 and the like and the WET mode set by the WET button 516 are effective only when the logical connection is being established. Accordingly, regarding the digital mixer 30 having such functions, it is effective to confirm a presence or absence of the logical connection in addition to the physical connection.

In the processes shown in FIGS. 10 and 11, the control microcomputer 35 of the digital mixer 30 serves as a detector and a display controller.

Figure 12:
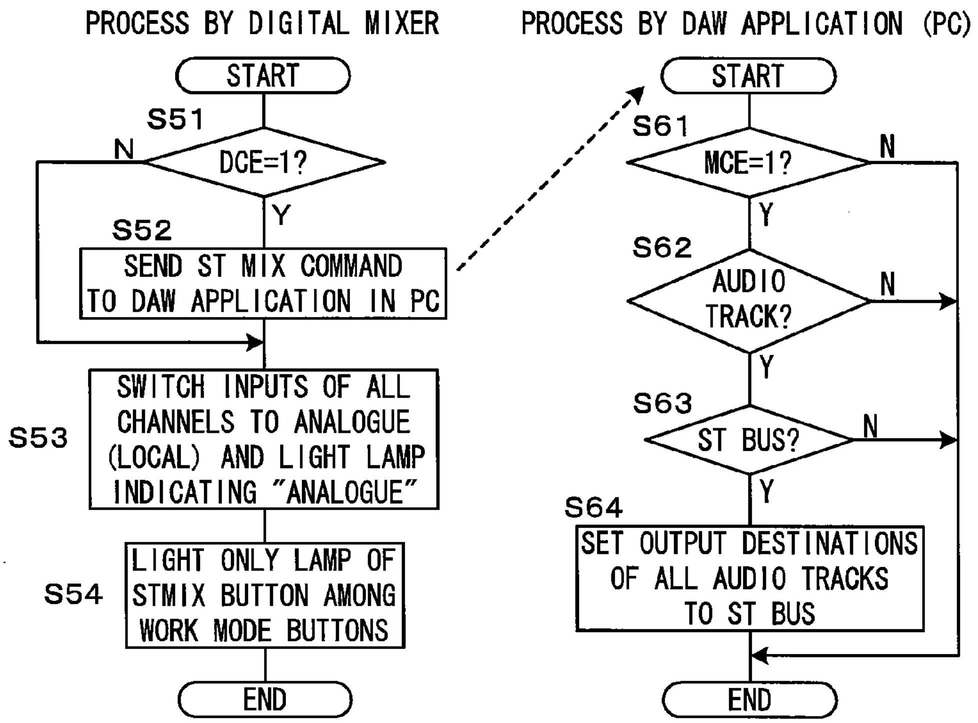
FIG. 12 is a flowchart of a process in response to an ON event of the STMIX button.
Figure 13:
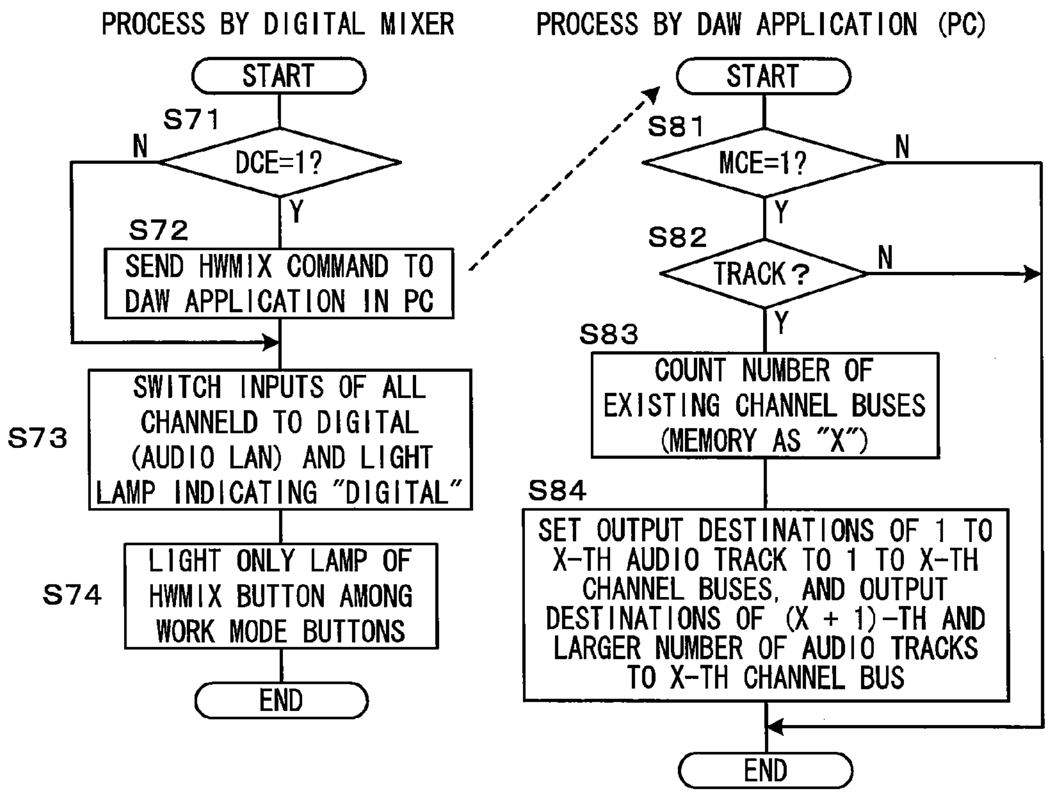
FIG. 13 is a flowchart of a process in response to an ON event of the HWMIX button.

With reference to FIGS. 12 and 13, processes related to the collective setting by the STMIX button 543, the HWMIX button 544 and the 5.1 MIX button 545 in the digital mixer 30 and the DAW application 20 will be described.

FIG. 12 shows a flowchart of a process corresponding to an ON event of the STMIX button.

When detecting an ON event of the STMIX button generated in response to a press of the STMIX button 543 (first set instruction), the digital mixer 30 starts the process in the left flowchart in FIG. 12.

When the connection confirmation flag DCE is “1” (S51), the digital mixer 30 sends an STMIX command to the DAW application 20 (S52) to make the DAW application 20 perform an operation according to the press of the STMIX button 543. When the connection confirmation flag DCE is not “1”, the digital mixer 30 does not send the command.

In both cases, the digital mixer 30 selects analogue inputs (input from local ADCs) at the input changeover switches 311 of all the input channel 310 shown in FIG. 3, and lights a lamp indicating "analogue" corresponding to the input changeover button 533 shown in FIG. 8C (S53).

Further, the digital mixer 30 lights only the lamp of the pressed STMIX button 543 among the three work mode buttons shown in FIG. 8D (S54), and ends the process.

When the logical connection to the DAW application 20 is not maintained, the STMIX button 543 simply serves as a button for a collective-selection of analogue inputs with respect to the input changeover switches 311 of all the input channels 310.

On the other hand, when receiving the STMIX command from the digital mixer 30, the DAW application 20 starts the process shown in the right flowchart of FIG. 12.

When the connection confirmation flag MCE is "1" (S61), an audio track (track 210 in FIG. 2) exists (S62), and an ST bus exists in the mixing bus 203 (S63), the DAW application 20 sets output destinations of all the audio tracks to the ST bus (S64), and ends the process.

Further, when connection confirmation flag MCE is not "1" in step S61, it represents that the DAW application 20 does not have a logical connection to the digital mixer 30 and is not under remote control from the digital mixer 30, so the DAW application 20 ends the process. Here, generally, the STMIX command is not received when the MCE is not "1."

When there are no audio tracks in step S62 or there are no ST buses in step S63, it represents that there are no parameters to be set in step S64, so the DAW application 20 ends the process. In these cases, the DAW application 20 can send a response indicating such situations to the digital mixer 30 to display an error indication or the DAW application 20 it self can display an error indication on the display of the PC 10.

In the process shown in FIG. 12, the control microcomputer 35 of the digital mixer 30 serves as a first collective setting device. Further, in step S64, the DAW application 20 serves as a second selecting device.

When the process in step S64 is executed through the above process, the DAW application 20 can switch the input changeover switches 311 of all the input channels 310 to analogue input according to the press of the STMIX button 543, and set the output destinations of all the tracks 210 to ST buses. In other words, settings of all of the input channels 310 and tracks 210 can be implemented at once.

As seen in FIGS. 2 and 3, in this setting, the waveform data inputted from the ADCs 31 of the digital mixer 30 is individually outputted from the direct out output of each input channel 310 to the DAW application 20. Then, when the user logically connects the waveform data of each input channel to a different preferable track among the tracks 210 by using the input patch 201, the waveform data processed in each input channel 310 can separately be recorded in the audio track 212. The waveform data outputted from the audio track 212 is all outputted to the ST bus of the mixing bus 203 to be mixed and sent back to the digital mixer 30. That is, in step S64, the DAW application 20 performs settings to output the waveform data from the audio track 212 to the ST bus 323 of the digital mixer 30 according to the remote control by the digital mixer 30.

When ST or DAW_ST is selected in the output patch 331, the mixed waveform data is outputted from the DACs 32 so that the user can monitor the waveform. When the DAW application 20 starts to reproduce in this condition, the waveform data reproduced in plural tracks 210 can be monitored as signals mixed in the DAW_ST bus. Further, when the DAW application 20 starts to record, the waveform data inputted from the ADCs 31 can separately recorded in the tracks 210 in a recording standby state while the waveform mixed with sound of the waveform data reproduced in other tracks 210 can be monitored.

Thus, the setting in response to the press of the STMIX button 543 is preferable in a situation where the audio signal inputted from each channel of the ADCs 31 of the digital mixer 30 are to be individually recorded in the tracks 210 of the DAW application 20 while audio signals reproduced in other tracks 210 and stereo-mixed in the DAW application 20 is to be monitored at the digital mixer 30 side. In this case, in order to monitor the audio signals being recorded in the tracks 210 at the same time, the audio signal being recorded can be outputted from the track by turning on a monitor button of the track. With this operation, the audio signals being recorded are stereo-mixed with the audio signals of other tracks 210 in the DAW application 20.

It is conceivable that the output patch 331 automatically selects ST (or DAW_ST) in response to the press of the ST MIX button 543. Further, regarding the setting of the input patch 201, since each channel of the ADCs 31 has a logical connection to different tracks 210 as a song default in the input patch 201, the setting at the creation of new song can be used without any modification.

Further, the processes implemented by the digital mixer 30 and the DAW application 20 in response to the press of the 5.1 MIX button 545 are the generally same as the process shown in FIG. 12. The different points are that the command sent in step S52 is a 5.1 MIX command, the determination in step S63 is made based on a presence or absence of the 5.1ch bus, and the output destination set in step S64 is the 5.1ch bus.

Then, with such a setting, the waveform data reproduced in the audio track of the DAW application 20 is all outputted to the 5.1ch bus in the mixing bus to be mixed and sent back to the digital mixer 30. In this case, since the digital mixer 30 does not have a 5.1 bus to input the signals, the user can select only the DAW_5.1 by the output patch 331. Due to this selection, the mixed waveform data can be outputted from the DAC 32 so that the user can monitor the signal.

Thus, the setting set in response to the press of the 5.1 MIX button 545 is preferable in a situation where the audio signal inputted from each channel of the ADCs 31 of the digital mixer 30 are to be individually recorded in the tracks 210 of the DAW application 20 while audio signals reproduced in other tracks 210 and 5.1ch-mixed in the DAW application 20 is to be monitored at the digital mixer 30 side.

The waveform data received by the ports P3 to P6 of the digital mixer 30 among the waveform data of 5.1 channel is transferred also to the input channels 310, but not inputted to the input channels 310 since the input changeover switches 311 of all the input channels 310 are switched to the analogue input. Further, the waveform data received by the ports P1, P2 is transferred to the ST bus 322; however, when the ST input on switch 328 is turned off, this transfer can also be stopped and this does not cause any problem.

Here, it is conceivable that the output patch automatically selects DAW_5.1 in response to the press of the 5.1 MIX button 545.

FIG. 13 shows a flowchart of a process in response to an HWMIX button on event.

When detecting an ON event of HWMIX button generated when the HWMIX button 544 is pressed (second set instruction), the digital mixer 30 starts the process of the left flowchart of FIG. 13.

Then, when the connection confirmation flag DCE is "1" (S71), the digital mixer 30 sends an HWMIX command to the DAW application 20 to let the DAW application 20 perform an operation in response to the press of the HWMIX button 544 (S72). When the connection confirmation flag DCE is not "1," the command is not sent.

In both cases, the digital mixer 30 selects digital input (input from audio LAN I/O) at the input changeover switches 311 of all the input channels 310 shown in FIG. 3, and lights a lamp indicating "digital" corresponding to the input changeover button 543 shown in FIG. 8C (S73).

Further, the digital mixer 30 lights the lamp of only the pressed HWMIX button 544 among the three work mode buttons shown in FIG. 8D (S74), and ends the process.

When the logical connection to the DAW application 20 is not maintained, the HWMIX button 544 simply serves as a button for collective-selection of digital inputs with respect to the input changeover switches 311 of all input channels 310.

On the other hand, when receiving the HWMIX command from the digital mixer 30, the DAW application 20 starts the process of the right flowchart in FIG. 13.

When the connection confirmation flag MCE is "1" (S81) and an audio track (track 210 in FIG. 2) exists (S82), the DAW application 20 counts the number of channel busses existing in the mixing bus 203 and memory the number as "X" (S83).

The channel bus is a bus for transmitting an audio signal to an input channel of an external device via an audio LAN. When the external device is a digital mixer 30 having twelve input channels, the value X becomes twelve at a maximum. According to the correspondence of FIG. 5, the buses having logical connections to the output ports P3 to P14 of the audio LAN I/O in the output patch 205 are detected as channel buses No. 1 to 12 and those numbers are counted.

Then, the output destinations of the first to X-th audio tracks are set to the first to X-th channel buses and the output destination of the (X+1)-th and following audio tracks are set to the X-th channel bus (S84), and the process is ended. Here, when the "X" is "0," there are no items to be set in step S84, so the setting is not performed.

Further, when the connection confirmation flag MCE is not "1" in step S81 or when the audio track does not exist in step S82, the DAW application 20 simply ends the process, similar to the case of steps S61 and S62 in FIG. 12.

It is conceivable that, when the output destination of each track is set to the channel bus in step S84, the DAW application 20 checks the setting of the input source of each track and preferentially allocates an i-th channel bus to the track selecting the output port Pi of the audio LAN (the track receiving an audio signal from an i-th input channel 310 of the digital mixer 30) to set as an output destination. With such a setting, the audio signal of the input channel, which is individually recorded in the track by the setting of the STMIX button 543, can be adjusted and hardware-mixed with the control of the same input channel using the setting by the HWMIX button 544. Regarding a track having an input source corresponding to an output destination (the input source is port Pi and the output destination is i-th channel bus), its signal is looped when the monitor button is turned on. Accordingly the monitor button is controlled not to be turned on.

With the process shown in FIG. 13, the control microcomputer 35 of the digital mixer 30 serves as a second collective setting device. Further, in the processes in steps S83 and S84, the DAW application 20 serves as a second selecting device.

With the above process, in case that the process in step S84 is executed, in response to the press of the HWMIX button 544, the input changeover switches 311 of all the input channels 310 are switched to the digital input side, and the output destinations of each track 210 can be set to deferent input channels 310 of the digital mixer 30, respectively. Here, since such a setting is not available when the number of the tracks 210 is greater than the number of the channel buses, the excess tracks are set to one of the channel buses, for example, a channel bus having the largest number. It is also conceivable that the output destinations of the excess tracks 210 are set to other busses such as ST buses or settings of the output destinations of the excess tracks 210 are maintained without change.

As seen in FIGS. 2 and 3, with the above setting, the waveform data inputted from the ADCs 31 of the digital mixer 30 is not processed. Accordingly, the waveform data processed in the DAW application 20 and the digital mixer 30 is mainly the data reproduced in the tracks 210 of the DAW application 20. Then, the waveform data is transmitted to the digital mixer 30 by the ports P3 to P14 via the individual channel buses, and inputted to corresponding input channels 310. In other words, in step S84, according to a remote control by the digital mixer 30, the DAW application 20 performs settings to individually output the waveform data of each audio track to the input channels 310 of the digital mixer 30.

Then, the waveform data processed in each input channel 310 is outputted to the REC bus 321, ST bus 322 and AUX bus 323 to be mixed. The waveform data mixed in the REC bus 321 and ST bus 322 can be sent back to the DAW application 20 to be recorded in one of the tracks 210, and the waveform data mixed in the ST bus 322 and AUX bus 323 can be outputted from the DAC 32 to be monitored when selecting the ST or AUX by the output patch 331.

Further, direct out output from the input channel 310 can be transmitted to the DAW application 20 to be recorded in one of the tracks 210, and the waveform data mixed in the AUX bus 323 can be outputted from a DAC for an AUX output to an external recorder to be recorded.

Therefore, the setting set in response to the press of the HWMIX button 543 is preferable in a situation where the waveform data reproduced in the tracks of the DAW application 20 is to be mixed with the hardware of the digital mixer 30, not with the hardware of the DAW application 20. The mixer system is often used for such a function in a stage of a tune production, such as a mastering process.

As described above, according to the mixer system, since work mode buttons such as the STMIX button 543 are provided, settings can be set to both of the digital mixer 30 and DAW application 20 at once to work in cooperation for a particular purpose, so its operability is improved. Further, when settings related to a destination of waveform data is changed in only one of the digital mixer 30 and the DAW application 20, it causes problems such that the transmission path is looped or that unexpected output signal damages a speaker and the like. However, the collective setting prevents such an error setting and problems.

Further, the process according to FIGS. 12 and 13 are processes to simply set each device in response to operations of the work mode buttons, and users can be allowed to change the respective settings. For example, it is not necessary to prohibit an operation to operate input changeover button 533 shown in FIG. 8C to switch the input changeover switch 311 in one of the channels, which are all set to analogue in step S53 in FIG. 12, to digital.

Here, it is conceivable to provide an option that the settings set by operating the work mode buttons can be changed only by operating the work mode buttons.

With reference to FIGS. 14 to 18, a process for switching between WET mode and DRY mode will be described. The switch between WET and DRY modes is effective especially in a condition that a collective setting is performed by pressing the STMIX button 543. Accordingly, the process will be described with an assumption including such a condition.

The DRY mode is a mode for, in digital mixer 30, inputting waveform data inputted from outside the device (via the ADCs 31) to an internal buses (the ST bus 322 or the AUX bus 323) for mixing without the DAW application 20 and outputting the mixed data to outside the device (via the DACs 32). Then, in this mode, the monitor output of the track 210 of the DAW application 20 is turned off and waveform data processed in the track 210 is not outputted. Accordingly, the data processed in the track 210 is not inputted to the ST bus 322, either.

The WET mode is a mode, in which the waveform data inputted from outside the device (via the ADCs 31) is transmitted to the DAW application 20 once, waveform data including the transmitted waveform data is sent back to the digital mixer 30, and the data is inputted to internal buses (the ST bus 322 or the AUX bus 323) for mixing and outputted to outside the device (via the DACs 32). In a condition that the setting is performed in response to the press of the STMIX button 543, as described above, the waveform data outputted from the tracks 210 in the DAW application 20 is all mixed in the ST bus and sent back to the digital mixer 30 to be mixed in the ST bus 322. Accordingly, in the WET mode, monitor output of the track 210 is turned ON to output the inputted waveform data to the ST bus of the DAW application 20 while the ST send ON switch 317 in the digital mixer 30 is turned OFF not to input the waveform data processed in the input channel 310 to the ST bus 322 directly.

The WET mode is effective only when the DAW application 20 and the digital mixer 30 are logically connected to each other and the setting in response to in response to the press of the STMIX button 543 is performed.

The DRY mode and the WET mode is used for monitoring, in each channel, DRY waveforms which is processed only in the digital mixer 30 and has little delay, and WET waveforms which is processed in the digital mixer 30 and the DAW application 20 and reflects sound to actually be recorded or reproduced, while switching the waveforms between DRY and WET. For example, the reproduction adjusting channel 213 of the DAW application 20 can perform an effect process by a plug-in effect, and the WET is useful to check the effectiveness of the process. Further, since the DRY waveform has little delay, it is preferable for monitoring by a performer.

In the mixer system, the digital mixer 30 has the WET button 516, so that the DRY mode and the WET mode can be switched by operating only a single control for each input channel 310. Accordingly, DRY and WET waveforms can be switched for monitoring regardless of which track 210 in the DAW application 20 is receiving the input of the waveform data being processed in each of the input channels 310.

Further, WET and DRY modes can be switched in an input channel and a track to which a signal inputted to the input channel is supplied without any influence to other input channels 310 or the tracks 210. Accordingly, even when the DAW application 20 is used to record a waveform in a particular track while reproducing a waveform in another track (this is a very common usage), the DRY and WET waveforms in the recording track can be compared with no influence to the reproduction.

Further, in this mixer system, HOLD mode is prepared in addition to the DRY mode and the WET mode. The HOLD mode is set when a switch to the WET mode in an input channel 310 is instructed but there are no tracks 210 in the DAW application 20 to input the waveform data from the input channel 310, and thus there are no paths to send back the waveform data to the digital mixer 30. The HOLD mode is set also when the track 210 to input the waveform data from the above-described input channel 310 is not in a recording standby state, and thus the waveform data processed in the track cannot be outputted to send back to the digital mixer 30 even by turning on the monitor output. In the HOLD mode, the setting is the same as that of the DRY mode, and the switching to the WET mode is automatically performed without user's operation when a proper track 210 is prepared and the track becomes a recording standby state in the DAW application 20.

Here, the reason why the state of the track 210 is required to be a recording standby state is to let the user specify a track 210 to be controlled for the DRY/WET switching even when outputs from the same input channel 310 are inputted to plural tracks 210 of the DAW application 20. That is, the user can perform the DRY/WET switching with respect to a desired track by setting the track in a recording standby state among the plural tracks 210.

The process will be described in detail.

Figure 14:
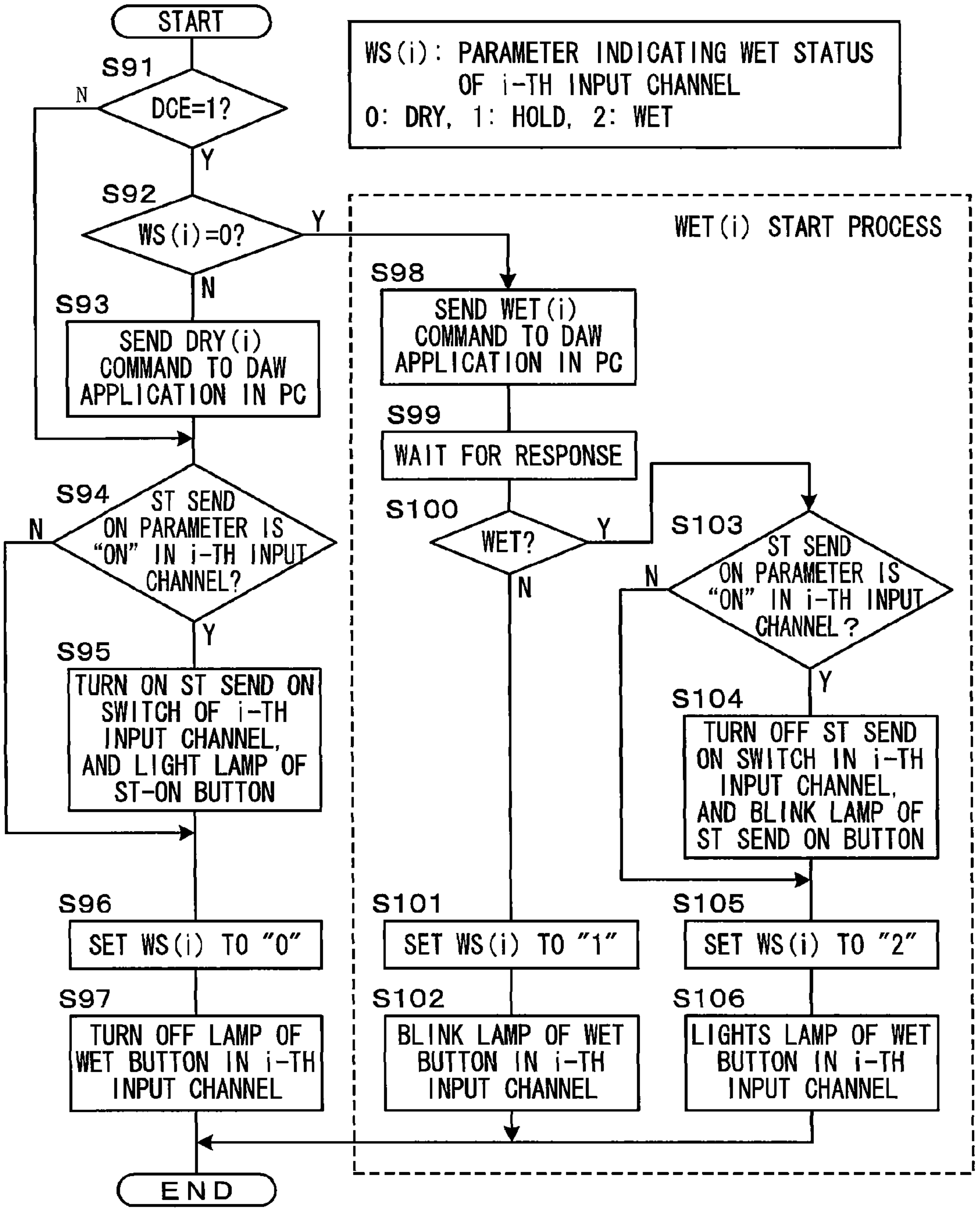
FIG. 14 is a flowchart of a process implemented by the digital mixer when detecting an ON event of the WET button of an i-th input channel.

FIG. 14 is a flowchart showing a process implemented by the digital mixer 30 when detecting an ON event of the WET button in the i-th input channel 310.

When detecting an ON event of the WET button generated when the WET button 516 of the channel strip corresponding to the i-th input channel 310 is pressed, the digital mixer 30 starts the process shown in the flowchart of FIG. 14.

When the connection confirmation flag DCE is “1” (S91), the process proceeds to step S92 and following steps to let the DAW application 20 perform operations in response to the press of the WET button 516.

Then, the digital mixer 30 determines whether or not the parameter WS(i), which indicates a WET function state of the i-th input channel 310, is “0” indicating DRY mode (S92). When the WS(i) is “0”, the process proceeds to a WET(i) start process in step S98 and following steps to switch the i-th input channel to the WET mode. When the WS(i) is “2” indicating WET mode or “1” indicating HOLD mode, the process proceeds to step S93 and following steps to switch the i-th input channel to the DRY mode.

In the processes in step S93 and following steps, firstly, the digital mixer 30 sends a DRY(i) command to the DAW application 20 to set a DRY mode to the track to which the waveform data of the i-th input channel is input (S93).

Then, in the i-th input channel 310 of the digital mixer 30, when a value of an ST send ON parameter, which is set by the ST ON button 515 shown in FIG. 8C, is “ON” (S94), the digital mixer 30 switches the ST send ON switch 317 of the i-th input channel 310 to “ON”, lights the lamp of the ST on button 515 to indicate the condition (S95), and proceed to step S96.

In general, the value of the ST send ON parameter corresponds to the ON or OFF state of the ST send ON switch 317; however, since they do not correspond to each other in some cases as described below, a process of step S95 is provided.

When the value of the ST send ON parameter is “OFF” in step S94, it is supported that the user is not going to output the signal of the input channel 310 to the ST bus 322, so, even in the DRY mode, the digital mixer 30 proceed to step S96 without turning ON the ST send ON switch 317 against the will.

On the other hand, the digital mixer 30 sets the parameter WS(i) to “0” which indicates DRY mode (S96), and turns off the lamp of the WET button 516 (WET button where an ON event occurred) of the i-th input channel to indicate that the channel is switched to DRY mode (S97), and then the process is ended.

When the connection confirmation flag DCE is not “1” in step S91, the process proceeds to step S94 to switch back the i-th input channel 310 to the DRY mode since the WET mode is not effective. As descried above regarding step S46 of FIG. 11, when the connection confirmation flag DCE is set to "0", all input channels 310 are set to DRY mode. Thus, also in this case, when the DEC is not "1" in step S91, the digital mixer 30 can end the process without performing the processes in step S94 and following steps.

On the other hand, in a WET(i) start process performed when the answer is YES in step S92, the digital mixer 30 transmits a WET(i) command to the DAW application 20 to set the track 210 to which the waveform data of the i-th input channel 310 is inputted, to the WET mode (S98), and waits for its response (S99). The DAW application 20 performs a process shown in the flowchart of FIG. 15 described below, in response to the WET(i) command and sends back a response of "WET" or "HOLD".

When the response is "HOLD" and not "WET" (S100), the digital mixer 30 recognizes that the i-th input channel 310 cannot immediately be switched to the WET mode, and thus the process proceeds to step S101 in order to set the channel to the HOLD mode.

In order to set to the HOLD mode, a particular settings are not required. The digital mixer 30 sets the parameter WS(i) to "1" (S101), blinks the lamp of the WET button 516 of the i-th input channel 310 to indicate that the channel is switched to the HOLD mode (S102), and ends the process.

When the response is "WET" in step S100, the process proceeds to step S103 in order to set the i-th input channel 310 to the WET mode.

When the value of the ST send ON parameter is "ON" in the i-th input channel 310 of the digital mixer 30 (S103), the digital mixer 30 turns OFF the ST send ON switch 317 of the i-th input channel 310, blinks the lamp of the ST ON button 515 to indicate that the value of the parameter is "ON" but the switch is turned OFF (S194), and proceeds to step S105. In the process of step S104, since the value of the ST send ON parameter is not changed, in this case, the value of the ST send ON parameter and the ON or OFF state of the ST send ON switch 317 do not correspond to each other.

When the value of the ST send ON parameter is "OFF" in step S103, the process proceeds to step S105 since the ST send ON switch 317 is already turned OFF and it is not required to be changed.

In the step S105 and following steps, the digital mixer 30 sets the parameter WS(i) to "2" which indicates the WET mode (S105), lights the lamp of the WET button 516 of the i-th input channel 310 to indicate the channel is switched to the WET mode (S106), and ends the process.

With the above described processes, when the WET button 516 in the digital mixer 30 is operated, the DRY mode and the WET mode (or the HOLD mode) are switched by toggling for each corresponding input channel 310 so that the ST send ON switch 317 can be switched to a proper state according to the mode.

Figure 15:
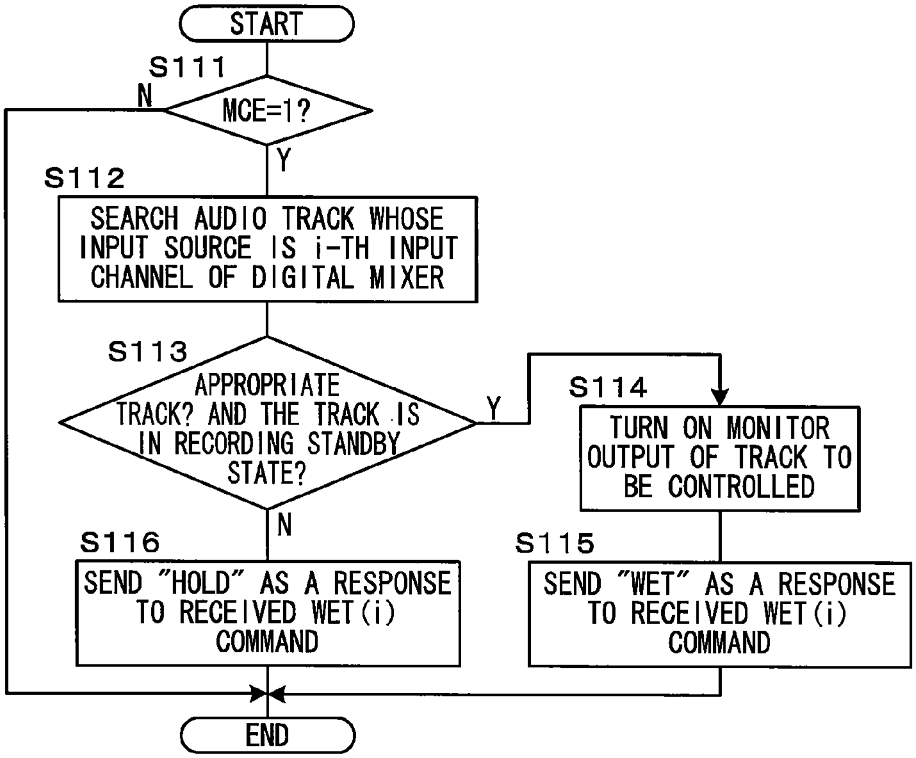
FIG. 15 is a flowchart of a process implemented by the DAW application when receiving a WET(i) command.

FIG. 15 shows a flowchart of a process implemented by the DAW application 20 when receiving a WET(i) command.

When receiving a WET(i) command which is sent by the digital mixer 30 in step S98 of FIG. 14, the DAW application 20 starts the process shown in the flowchart in FIG. 15.

When connection confirmation flag MCE is "1" (S111), the DAW application 20 searches an audio track (track 210 in FIG. 2) whose input source is an input port Pi for receiving the waveform data of the i-th input channel 310 from the digital mixer 30 (S112). In this process, plural tracks can match the search condition.

When an appropriate track 210 is found and the track (found track) is in the recording standby state (S113), the DAW application 20 turns ON the monitor output of the track (track to be controlled) (S114), transmits "WET" as a response to the received WET(i) command (S115), and ends the process.

When an appropriate track is not found or none of the found tracks are in the recording standby state in step S113, the DAW application 20 transmits "HOLD" as a response to the received WET(i) command (S116), and ends the process.

When the connection confirmation flag MCE is not "1" in step S111, the DAW application 20 simply ends the process, similar to the case of the step S61 in FIG. 12.

The DAW application 20 can send different response to the digital mixer 30 in cases that there are no corresponding tracks in step S113 and that there are no corresponding tracks in a recording standby state so that the digital mixer 30 can distinguish the reason why the input channel 310 is set to the HOLD mode.

Further, as described above, the measurement regarding the recording standby state is made for the user to be able to select a track to be switched to WET when there are plural found tracks. Accordingly, if it is not necessary, the DAW application 20 can switch all the corresponding tracks to WET (turns ON the monitor outputs) without the measurement regarding the recording standby state.

If the tracks which are not in recording standby state are not switched to WET, it can be a problem when the found track is not in recording standby state in step S113 and its monitor output is ON. Accordingly, the monitor output of such a track can automatically be turned OFF.

Figure 16:
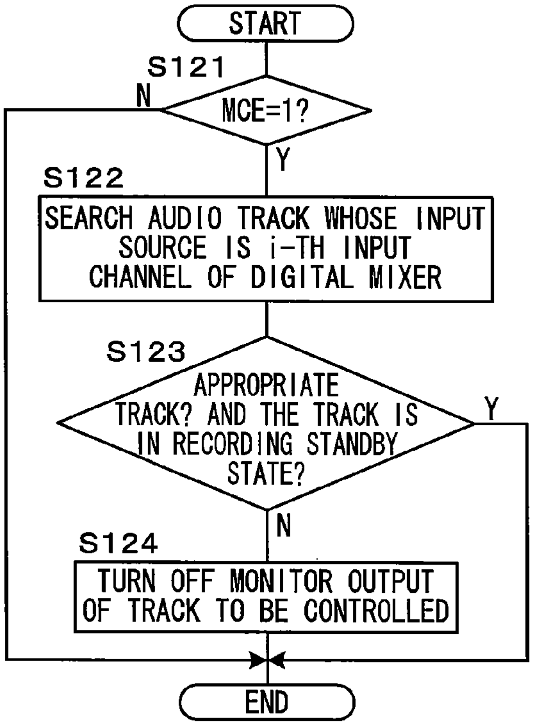
FIG. 16 is a flowchart of a process implemented by the DAW application when receiving a DRY(i) command.

FIG. 16 shows a flowchart of a process implemented by the DAW application 20 when receiving a DRY(i) command.

When receiving DRY(i) command which is sent by the digital mixer 30 in step S93 of FIG. 14, the DAW application 20 starts a process shown in flowchart of FIG. 16.

When the connection confirmation flag MCE is "1" (S121), similar to step S112 of FIG. 15, the DAW application 20 searches an audio track (track 210 in FIG. 2) whose input source is an input port Pi for receiving the waveform data of the i-th input channel 310 from the digital mixer 30 (S122). When an appropriate track 210 is found and the track is in a recording standby state (S123), the DAW application 20 turns OFF the monitor output of the track (track to be controlled) (S124), and ends the process.

When an appropriate track is not found in step S123 or when none of the found tracks are in a recording standby state, it represents that there are no tracks to be controlled, so the DAW application 20 ends the process.

When the connection confirmation flag MCE is not "1" in step S121, similar to the step S61 of FIG. 12, the DAW application 20 simply ends the process.

With the above processes shown in FIGS. 15 and 16, the DAW application 20 can modify settings for switching modes in cooperation with the digital mixer 30, in response to the press of the WET button 516 in the digital mixer 30.

Figure 17:
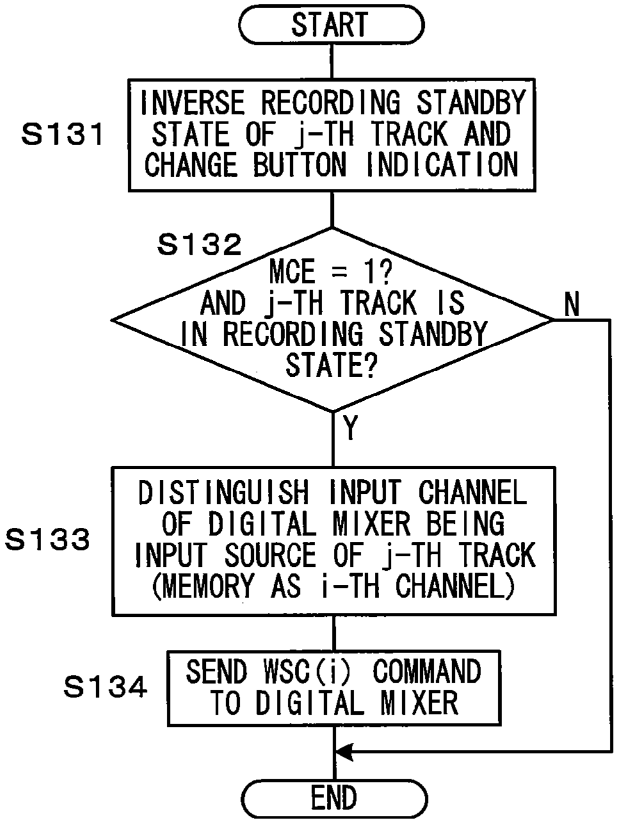
FIG. 17 is a flowchart of a process implemented by the DAW application when detecting an operation event of a recording standby button of a j-th track.

FIG. 17 shows a flowchart of a process implemented by the DAW application 20 when detecting an operation event of the recording standby button 411 of the j-th track 210.

When detecting an operation event of the recording standby button 411 of the j-th track 210, the DAW application 20 starts the process shown in the flowchart of FIG. 17. In this process, it is not necessary to find whether or not the j-th track 210 existed at the time of implementing the processes shown in FIG. 15.

In this process, as a usual process in response to the press of the recording standby button 411, the DAW application 20 inverses the recording standby state of the j-th track and changes the indication of the button according to the inversion (S131). In other words, every time the recording standby button 411 is pressed, the j-th track which is not in a recording standby state is switched to be in a recording standby state, and the j-th track which is in a recording standby state is switched not to be in a recording standby.

Then, when the connection confirmation flag MCE is "1" and the j-th track is in a recording standby state (S132), the DAW application 20 finds the number of the input channel 310 in the digital mixer 30 being the input source of the j-th track, and assign the number to a variable i (S133). Here, according to the correspondence in FIG. 4, the number of the input channel 310 can be found based on the input source port of each track. In a case where the input source port is the input port Pi of the audio LAN (1=<i=<12), the input is from the i-th input channel 310, and in other cases, the input is not from the input channel 310.

Then, the DAW application 20 sends a WSC(i) command to the digital mixer 30 to order to recheck the state of the DRY/WET mode of the i-th input channel 310 (S134), and ends the process. It is noted that the WSC(i) command is not sent in step S134 when the input source is not any of the input channels 310.

When the connection confirmation flag MCE is not "1" in step S132, since it is not required to remote control the digital mixer 30, the DAW application 20 simply ends the process.

Figure 18:
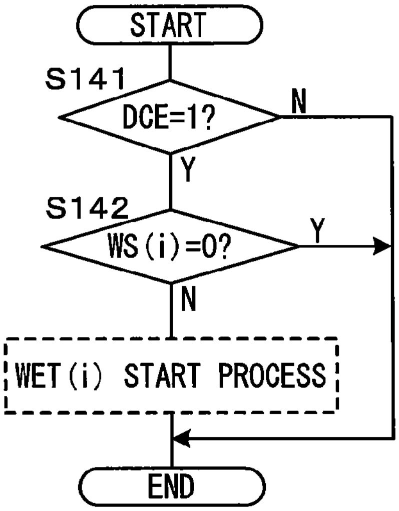
FIG. 18 is a flowchart of a process implemented by the digital mixer when receiving a WSC(i) command.

FIG. 18 shows a flowchart of a process implemented by the digital mixer 30 when receiving a WSC(i) command.

When receiving a WSC(i) command which is sent by the DAW application 20 in step S134 of FIG. 17, the digital mixer 30 starts the process shown in the flowchart of FIG. 18.

When the connection confirmation flag DCE is "1" (S141) and the parameter WS(i) is not "0" indicating DRY (S142), the digital mixer 30 performs the WET(i) start process shown in steps S98 to S106 of FIG. 14, and ends the process.

Also in this WET(i) start process, since a WET(i) command is transmitted, the DAW application 20 performs the process shown in FIG. 15. Here, the conditional branching in step S142 can be set to branch to "N" only when the WS(i) is "1".

When the connection confirmation flag DCE is not "1" in step S141, it is not required to receive a remote control from the DAW application 20, the digital mixer 30 ends the process.

When the WS(i) is "0" in step S142, since the modes in the digital mixer 30 are not changed corresponding to the change of the recording standby state in the DAW application 20, the digital mixer 30 ends the process.

With the above described processes of FIGS. 17 and 18, when the track 210 of the DAW application 20 to which the signal of the input channel 310 in the HOLD mode is inputted is switched to a recording standby state, it is possible to automatically set necessary settings to switch the input channel 310 to the WET mode. Further, when the recording standby state of all the tracks 210 of the DAW application 20 to which the signals of the i-th input channel 310 in WET mode is inputted is released, similar to the FIGS. 17 and 18, a WSD(i) command is sent to the digital mixer 30 to automatically set necessary settings (for example, the processes in steps S95 and S98 to S102) to switch the i-th input channel 310 to the HOLD mode. Any additional modification is not performed when the changes of recording standby state are made in other tracks.

When input sources of the track 210 in recording standby state are changed in DAW application 20, the same modifications can be required in some cases. Accordingly, it is conceivable that, regarding the k-th input channel as the input source before the change and the 1-th input channel as the input source after the change, a WSC(k) command and a WSC(1) command are sent to the digital mixer 30.

When the monitor output of the track 210 in a recording standby state is turned ON, if the waveform data of the input channel 310 in the digital mixer 30 which is in the DRY mode is being inputted to that track, the waveform data is duplicated in ST bus 322.

Accordingly, it is preferable that the DAW application 20 outputs a predetermined command to the digital mixer 30 according to the operation for turning ON the monitor output to switch the corresponding input channel 310 to the WET mode.

Alternatively, it is also preferable that, while the logical connection is maintained (while DCE=1), switching of the monitor output by the user is prohibited with respect to the tracks to be control targets of the DRY and WET switching.

These are the process in response to the press of the WET button 516 and the process related thereto. When the WET master button 542 shown in FIG. 8D is pressed, the digital mixer 30 implements processes shown in steps S98 to S106 of FIG. 14 for all the input channels individually in order to collectively set WET mode to all the input channels 310 of the digital mixer 30. With such a button, all the input channels 310 can be set to WET mode with a single operation and further improved operability can be obtained.

It is noted that the settings made in response to the press of the WET master button 542 can be changed by operating the WET buttons 516 for each input channel.

The REC WET button 541 of the digital mixer 30 is a button for setting WET mode to signal of the REC bus 321 to be transmitted to the DAW application 20. Regarding the REC bus 321, since there is not a path to directly input the signal to the ST bus 322 in the digital mixer 30, a DRY mode of the REC bus does not exist and only ON or OFF the WET mode is set.

When the REC WET button 541 is pressed, the digital mixer 30 performs the process which is almost the same as FIG. 14. Hereinafter, the process will be described using the step numbers in FIG. 14. The processes implemented by the DAW application 20 are almost the same as that in FIGS. 15 and 16, and thus the process will be described using the step numbers in FIGS. 15 and 16, similarly.

In this case, a parameter WS(REC) which indicates the state of the WET function of the REC bus 321 is used for the decision in step S92. As regards WS(REC), "0" indicates WET mode OFF, "1" indicates HOLD, and "2" indicates WET mode ON.

A WET(REC) start process for setting the REC bus 321 to the WET mode will be described. In step S98, the digital mixer 30 sends a WETON(REC) command to the DAW application 20, as a substitute for the WET(i) command, and waits for a response from the DAW application 20 (S99).

When receiving the WETON(REC) command, the DAW application 20 performs almost the same process as that of FIG. 15.

In this case, when the connection confirmation flag MCE is "1" (S111), the digital mixer 30 searches a track 210 whose input sources are the input ports P13 and P14 for receiving waveform data of the REC bus 321 (S112). When an appropriate track 210 is found and the track is in the recording standby state (S113), the DAW application 20 turns ON the monitor output of the track to be controlled (S114), sends "WET" as a response to the received WETON(REC) command (S15), and ends the process. Further, when the appropriate track is not found in step S113, or none of the found tracks are not in the recording standby state, the DAW application 20 sends "HOLD" as a response to the received WETON(REC) command (S116) and ends the process.

When a response received in step S99 is not "WET" (S100), since the digital mixer 30 recognizes the condition that the REC bus 321 is not immediately switched to the WET mode, the digital mixer 30 sets the parameter WS(REC) to "1", blinks the lamp of the RECWET button 541 (S102), and ends the process. When the response in step S99 is "WET" (S100), (since the REC bus 321 does not have a sending path to the ST bus 322) the processes in steps S103 and S104 are skipped, and the process proceeds to step S105 to set the parameter WS(REC) to "2", light the lamp of the RECWET button 641 to indicate that the WET mode is turned ON (S106), and the process is ended.

Next, processes in steps S93-S97 for turning OFF the WET mode of the REC bus 321 will be described.

In this process, the digital mixer 30 sends a WETOFF (REC) command to the DAW application 20 as a substitute for the DRY(i) (S93), (since the REC bus 321 does not have a sending path to the ST bus 322) the steps S94 and S95 are skipped, and the process proceeds to step S96 to set the parameter WS(REC) to "0" (S96), lights the lamp of the RECWET button 541 (S97), and ends the process.

When receiving the WETOFF(REC) command, the DAW application 20 performs a process almost the same as that of FIG. 16.

In this process, when the connection confirmation flag MCE is "1" (S121), the DAW application 20 searches the a track 210 whose input sources are input ports P13 and P14 for receiving the waveform data of the REC bus 321. When an appropriate track 210 is found and the track is in the recording standby state (S123), the DAW application 20 turns OFF the monitor output of the track to be controlled (S124).

In the above description, the digital mixer 30 changes only ON and OFF of the ST send ON switch 317 in response to the press of the WET button 516; however, if the DAW application 20 always includes AUX bus to the output destination of the waveform data of all the tracks 210 (whose monitor output is ON), at that timing, the effective/disabled of the signal transmission to the AUX bus 323 from the input channel 310 can be changed. With such a process, the signals in the AUX bus 323 can be also monitored while switching between DRY and WET waveforms.

The above is all the description of an embodiment; however, it should be noted that the embodiment should not be limited to the above described system configuration, screen configuration, concrete process contents, and the like.

For example, according to the above embodiment, the number of ports for transmitting and receiving waveform data to and from the audio LAN of the digital mixer 30 are sixteen for transmission ports and sixteen for reception ports; however, this is only an example and those numbers can be determined arbitrarily. Also, those numbers are not needed to be the same. Then, in the PC 10, transmission and reception ports corresponding to the number of the ports in the digital mixer 30 are prepared.

Further, according to the above embodiment, in step S84 in FIG. 13, in case that the DAW application 20 sets output destination of each track in response to the HWMIX command, if an audio track which number is (X+1) or larger exists, all the output destinations of those tacks are set to the X-th channel bus; however, alternatively, output destinations of audio tracks whose number is (X+1) or larger can be set to the ST bus of the DAW application 20. With such a structure, the number of tracks individually operable by the control on the operation panel of the digital mixer 30 can be increased by 1.

Furthermore, according to the above embodiment, the instructions of STMIX and HWMIX are made with buttons on the operation panel of the digital mixer 30; however, two buttons for respectively selecting STMIX and HWMIX can be provided on the screen displayed by the DAW application 20.

In this case, it is considered that, according to the operations of those buttons, the DAW application 20 transmits commands for generating an STMIX ON event or an HWMIX ON event to the digital mixer 30 so that the DAW application 20 and the digital mixer 30 implement processing shown in FIG. 12 or 13. Or, it is also conceivable that, according to the operation of those buttons, the DAW application 20 sends command to the digital mixer 30 to order to perform processes in steps S53 and S54 or processes in steps S73 and 74 while performing the processes in the FIG. 12 or 13.

According to the description related to FIG. 9, the case in which one device is connected to the PC 10 has been explained; however, when plural devices are connected to the PC 10, the basic processes are not changed. In other words, in step S11, device IDs of the plural devices are obtained, and in step S12, a synergetic control program corresponding to the combination of those device IDs are activated and a connection template for the combination is installed, and then, the operations based on the synergetic control program and the connection template are performed. Further, the synergetic control program has been described as a plug-in program of the DAW application 20; however, it can be an application program independent from the DAW application 20.

Further, it is also conceivable that a plurality of DAW applications is activated in the PC 10 and the digital mixer 30 switches the DAW applications 20 to which logical connection is to be established. In this case, every time the DAW application is switched, the digital mixer 30 disconnects the logical connection to the current DAW application, and transmits a command to the PC 10 to order the DAW application to which a new logical connection is to be established to perform processes in step S12 and following steps in FIG. 9. Further, it is conceivable that the connection confirmation lamp 551 shown in FIG. 8E is provided to every DAW applications to be a destination of the logical connection, and the lamp corresponding to the destination of the logical connection is turned on or turned off in the processed in FIGS. 10 and 11.

Further, the controls or lamps described in the above embodiment do not have to physically exist and can be shown on a screen using a touch panel, a display, or the like.

Further, according to the above embodiment, the digital mixer 30 has been described as an audio signal processing device; however, it should be noted that the present invention is applicable to an audio signal processing system including other audio signal processing devices such as a recorder, an effector, a synthesizer and a sound generating device.

Further, the present invention can be applicable as inventions of method, program or recording medium in addition to the invention of system and device.

These embodiment and modifications described above are applicable in any combination in a range without contradiction. The present invention should not be limited to what is composed of all of the above configurations.

As seen in the above description, according to the audio signal processing system of the invention, the operability of an audio signal processing system established by connecting an audio signal processing device and a computer can be improved.

Therefore, an application of the present invention provides an audio signal processing system with an improved operability.

What is claimed is:

1. An audio signal processing system comprising:

an audio signal processing device that processes one or more inputted audio signals in one or more channels, mixes the processed signals in one or more buses, and outputs the signals mixed in the buses; and a computer that sends and receives plural audio signals to and from said audio signal processing device via a communication path and executes an application program which realizes a function of plural tracks, each of which inputs an audio signal selected from the received audio signals, records the input signal, plays back the recorded signal, and outputs one of the signal inputted to the track and the played back signal to be sent to said audio signal processing device, wherein said audio signal processing device sends an audio signal inputted to each channel of said audio signal processing device to said computer via the communication path, wherein said audio signal processing device comprises a selection control that accepts a first selecting operation of a user, corresponding to any one of the channels, and selects one of a dry signal of the channel, which is an audio signal processed in the channel, and a wet signal of the channel, which is an audio signal sent from the channel in said audio signal processing device to said computer and sent back to said audio signal processing device via the communication path after processed in said computer, to be supplied to the bus in response to the first selecting operation, and wherein, when the dry signal is selected by said selection control of one of the channels, said audio signal processing device controls itself to supply an audio signal processed in said one channel, as the dry signal of the channel, to the bus and remote-controls said computer not to send back the audio signal from a track to which the audio signal sent from said one channel is inputted, to said audio signal processing device via the track and the communication path, and when the wet signal is selected by said selection control of one of the channels, said audio signal processing device controls itself not to supply the audio signal processed in said one channel to the bus and remote-controls said computer to send back the audio signal from a track to which the audio signal sent from said one channel is inputted, as the wet signal of the channel, to said audio signal processing device via the communication path to supply the returned signal to the bus.

2. An audio signal processing system according to claim 1, wherein said audio signal processing device remote-controls the track in said computer, to which the audio signal sent from said one channel is inputted, if the track is in a recording standby state.

3. An audio signal processing system according to claim 1, wherein said audio signal processing device comprises plural channels, and wherein said audio signal processing device comprises a master selection control that accepts a second selecting operation of the user, corresponding to all of the channels, and causes said selection control to select wet signals to be supplied to the bus for all of the channels.

4. An audio signal processing system according to claim 2, wherein said audio signal processing device comprises plural channels, and wherein said audio signal processing device comprises a master selection control that accepts a second selecting operation of the user, corresponding to all of the channels, and causes said selection control to select wet signals to be supplied to the bus for all of the channels.

5. An audio signal processing system according to claim 2, wherein said audio signal processing device comprises a display corresponding to said selection control and a display controller that displays, on said display, that a selection by said selection control is not reflected to the remote control when the audio signal sent from said one channel is inputted to no track in said computer.

6. An audio signal processing system according to claim 2, wherein said audio signal processing device comprises a display corresponding to said selection control and a display controller that displays, on said display, that a selection by said selection control is not reflected to the remote control when the track, to which the audio signal as the signal sent from said one channel is inputted, is not in a recording standby state in said computer.

7. An audio signal processing system according to claim 2, wherein, when one track in said computer is switched from a released state to the recording standby state by the user, the state of the dry/wet selection of a channel in said audio signal processing device, from which the audio signal inputted to the one track is sent, is checked, and if the wet signal is selected, said audio signal processing device controls itself not to supply the audio signal processed in the channel to the bus and remote-controls said computer to send back the audio signal from a track to which the audio signal sent from the channel is inputted, as the wet signal of the channel, to said audio signal processing device via the communication path to supply the returned signal to the bus.

8. An audio signal processing system according to claim 1, wherein said audio signal processing device is a digital mixer.

9. An audio signal processing system according to claim 1, wherein said audio signal processing device comprises a channel strip corresponding to said channel and provided with controls for setting parameters of the corresponding channel.

10. An audio signal processing system according to claim 9, wherein said selection control is provided in said channel strip.

11. An audio signal processing system according to claim 1, wherein said audio signal processing device comprises a connection confirmation indicator which displays whether logical connection between said audio signal processing device and said application program executed in said computer is established or not.

12. An audio signal processing system according to claim 1, wherein said audio signal processing device comprises a connection detector that detects whether logical connection between said audio signal processing device and said application program executed in said computer is established or not, and wherein said audio signal processing device remote-controls said computer only if said connection detector detects that logical connection between said audio signal processing device and said application program executed in said computer is established.

13. An audio signal processing system comprising: a computer that executes application software to realize a function of a recording and editing device that records and edits the audio signals; and an audio signal processing device that processes the audio signals, said computer and said audio signal processing device being connected via a communication path through which a control signal and plural audio signals can be transmitted, wherein said computer comprises a transmission and reception device that receives the audio signals sent by said audio signal processing device to supply to said recording and editing device and transmits the audio signals supplied from said recording and editing device to said audio signal processing device via the communication path, wherein said recording and editing device comprises:

a plurality of tracks that record and/or reproduce audio signals inputted to the tracks;

a plurality of selecting devices provided corresponding to the tracks respectively to select an audio signal to input to a corresponding track from the audio signals supplied from said transmission and reception device;

a plurality of track channels provided corresponding to the tracks respectively to select one of an audio signal inputted to the track and an audio signal reproduced in the track and control a characteristic of the selected audio signal; and a first mixing bus that mixes the audio signals supplied from the plurality of track channels to supply to said transmission and reception device, wherein said audio signal processing device comprises:

an input device that inputs an audio signal from outside the device;

one or more input channels that controls a characteristic of the audio signal inputted from the input device;

a transmission and reception device that transmits the audio signal inputted from each of the input channel by the input device to said computer via the communication path and receives an audio signal from said computer via the communication path;

a second mixing bus that mixes the audio signals supplied from each of the input channels and the audio signal supplied from said transmission and reception device and outputs the mixed signal output outside the device; and a selection control that accepts a selecting operation of a user and selects one of “dry” or “wet” for each of the input channels, wherein, when said selection control selects “dry” for one of the input channels, said audio signal processing device controls itself to supply an audio signal having a characteristic controlled by said one input channel to said second mixing bus and controls said recording and editing device in said computer such that, as regards a track channel corresponding to a track for which a corresponding selecting device selects an audio signal inputted to said one input channel as an audio signal to input to the track, the track channel selects an audio signal to be reproduced in the track to control the characteristics of the audio signal, wherein, when said selection control selects “wet” for one of the input channels, said audio signal processing device controls itself to stop supplying the audio signal having a characteristic controlled by said one input channel to said second mixing bus and controls said recording and editing device in said computer such that, as regards a track channel corresponding to a track for which a corresponding selecting device selects an audio signal inputted to said one input channel as an audio signal to input to the track, the track channel selects an audio signal to be inputted to the corresponding track to control the characteristics of the audio signal.

* * * * *